April 7, 1925.
R. B. GAUNT
GRAIN SHOCKER
Filed Sept. 26, 1921   12 Sheets-Sheet 1
1,532,132
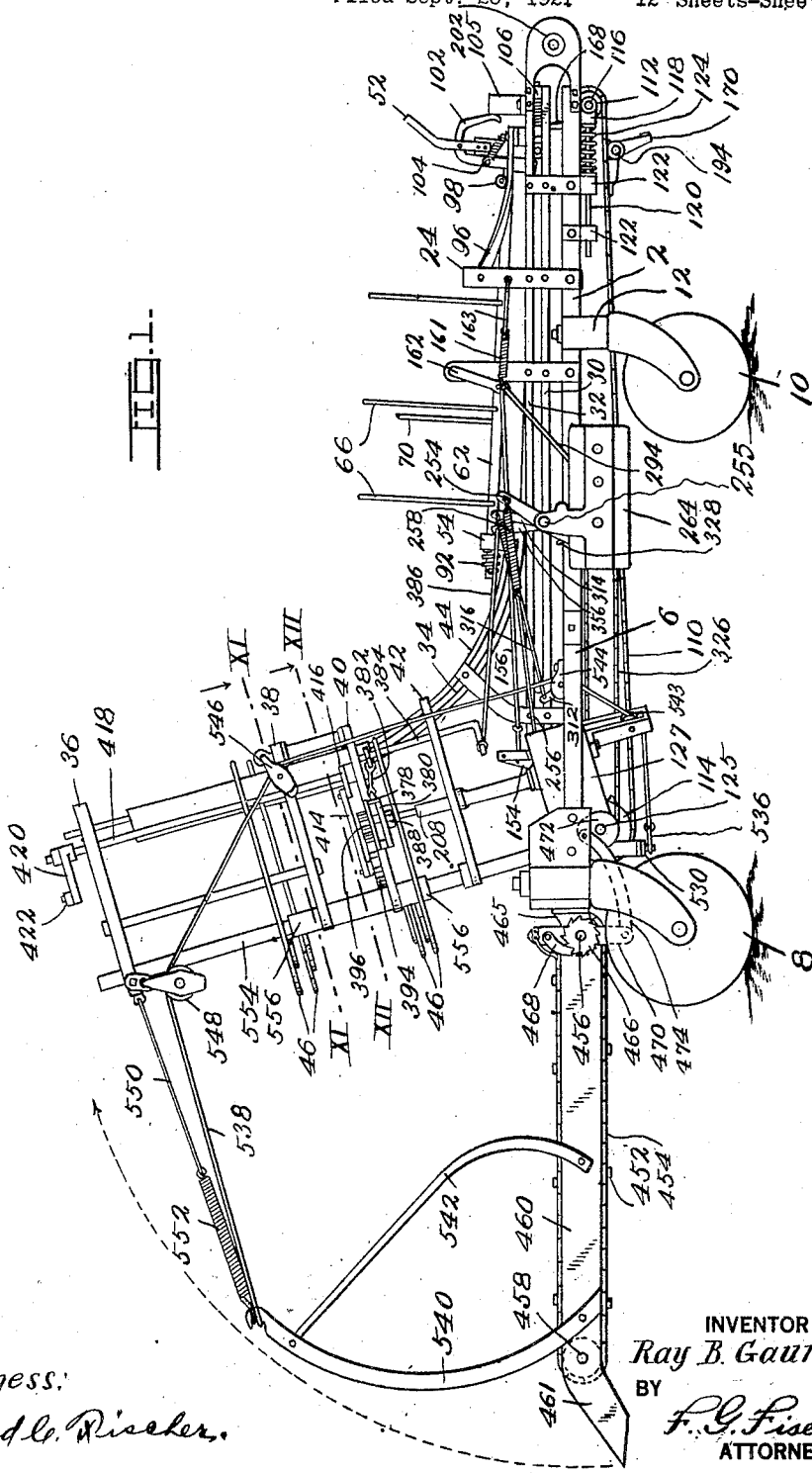
INVENTOR
Ray B. Gaunt,
BY
F. G. Fischer,
ATTORNEY
Witness:
Fred C. Rissler.

April 7, 1925.  1,532,132
R. B. GAUNT
GRAIN SHOCKER
Filed Sept. 26, 1921  12 Sheets-Sheet 2
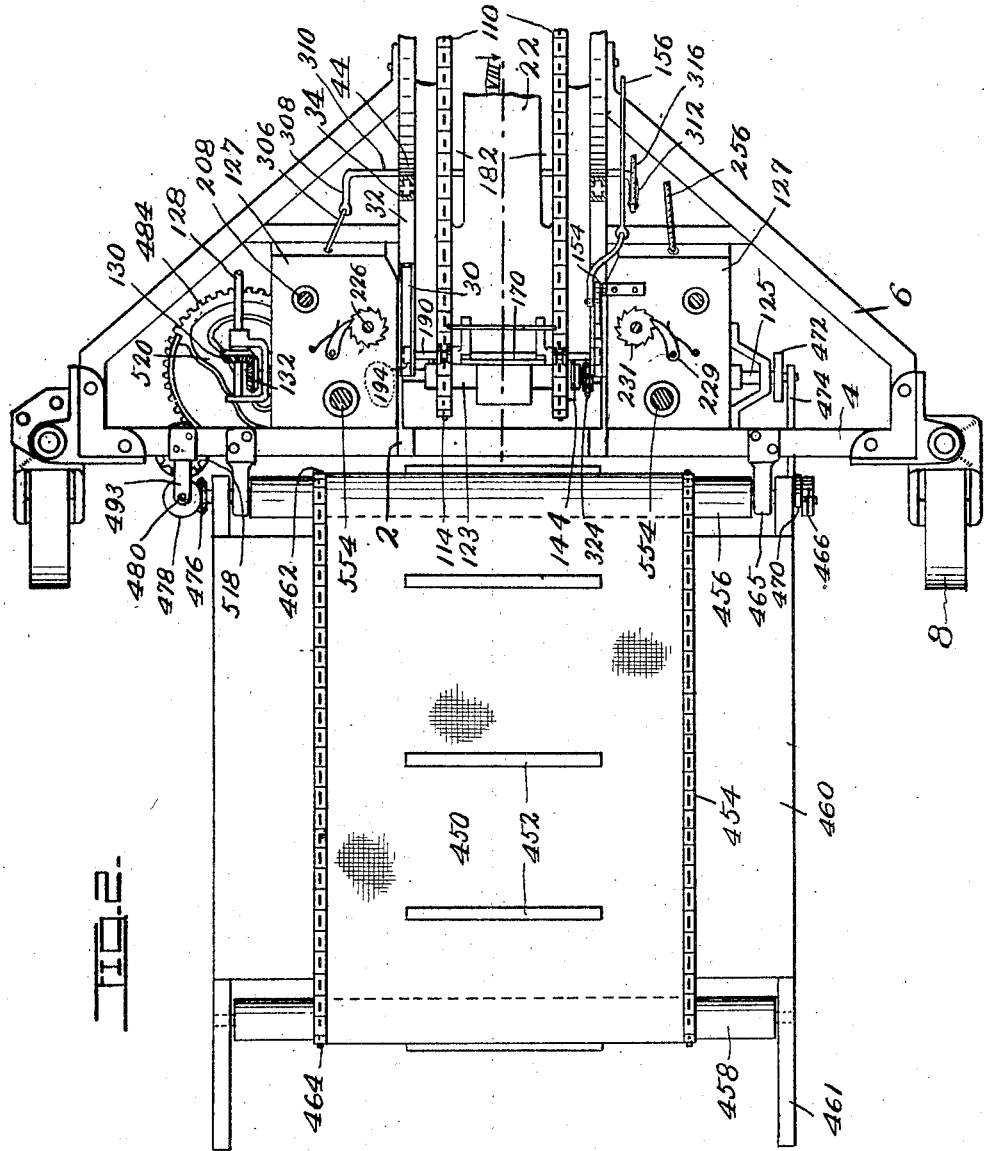
Witness:
Fred C. Rischer
INVENTOR
Ray B. Gaunt,
BY
F. G. Fischer
ATTORNEY

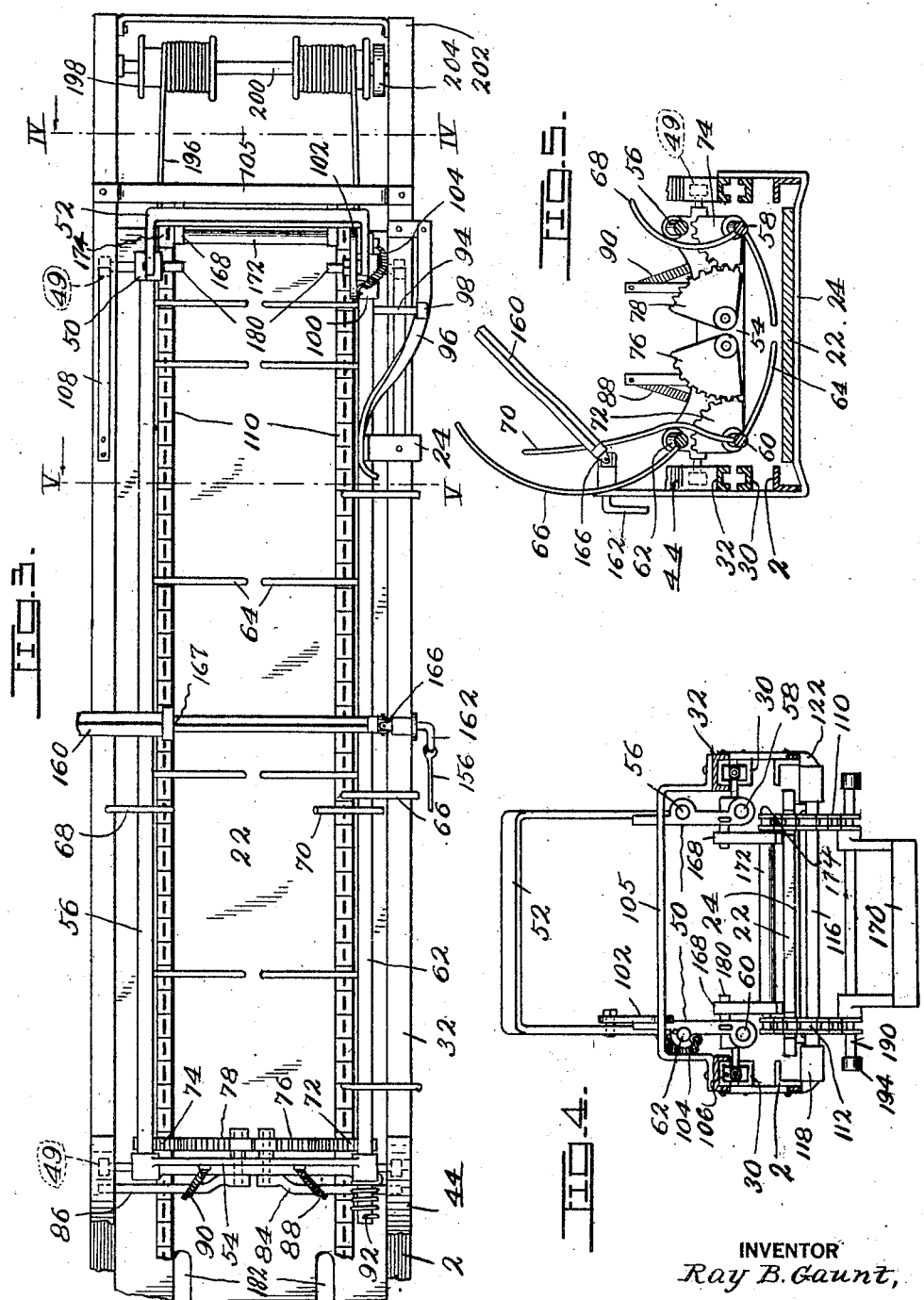

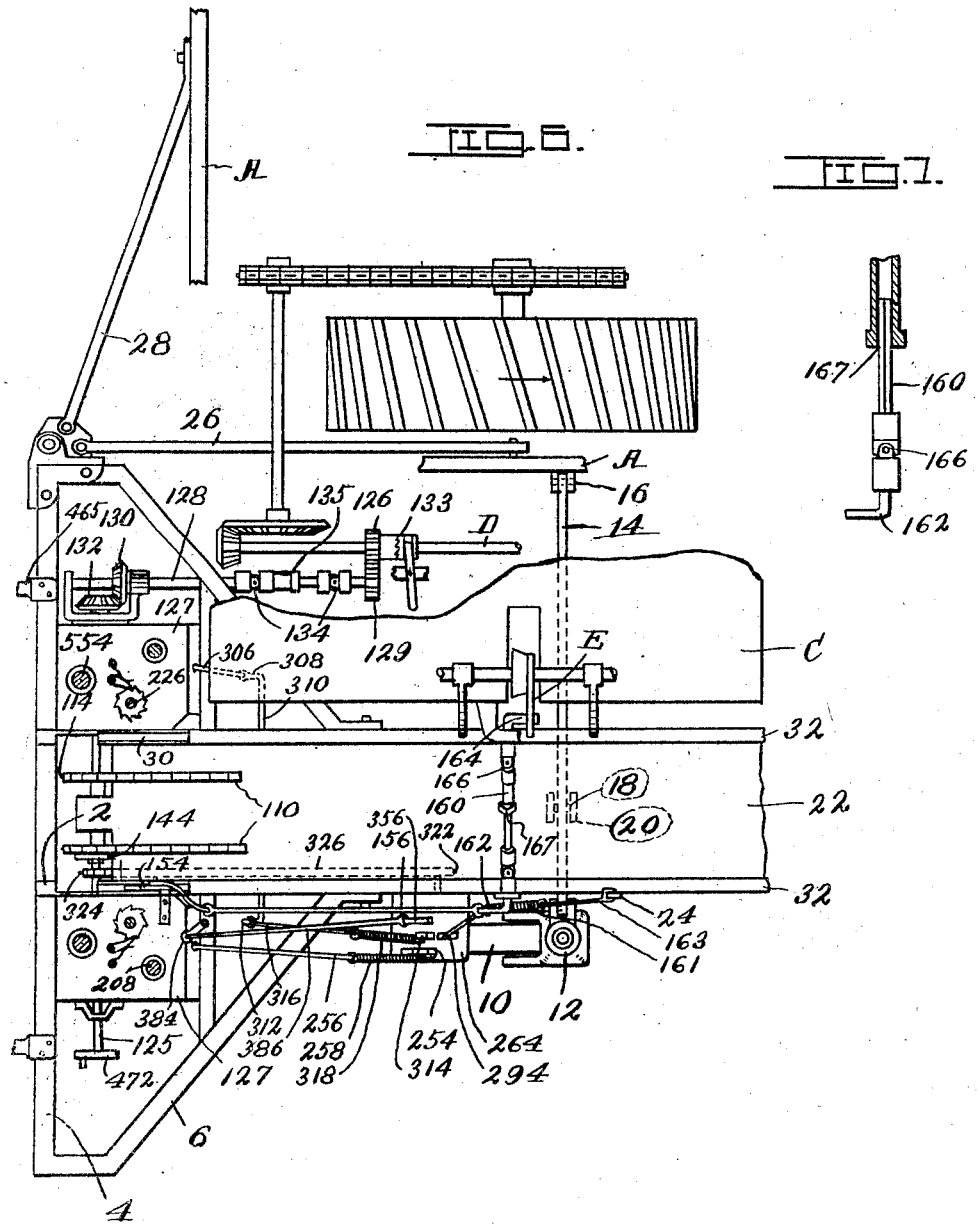

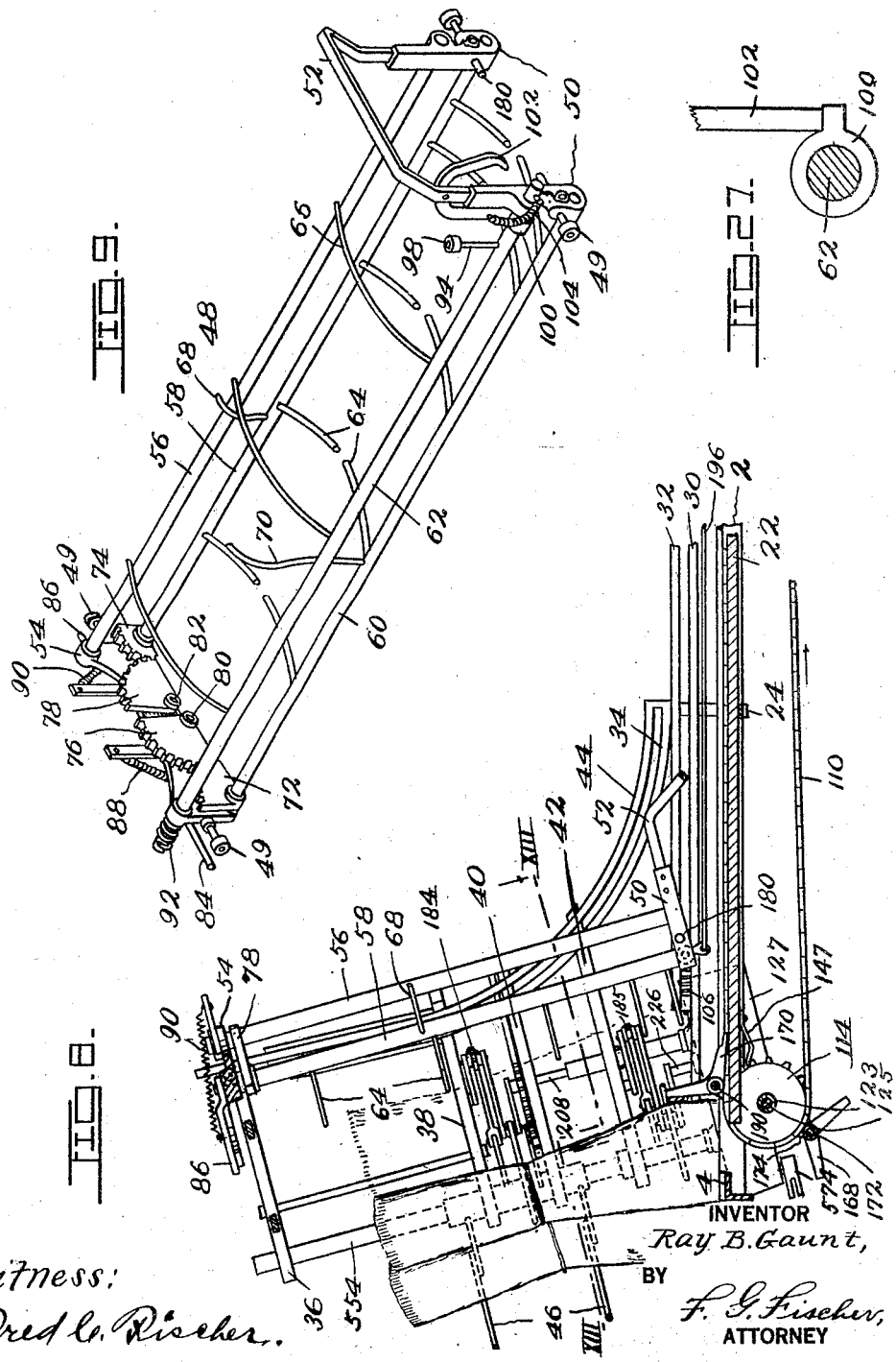

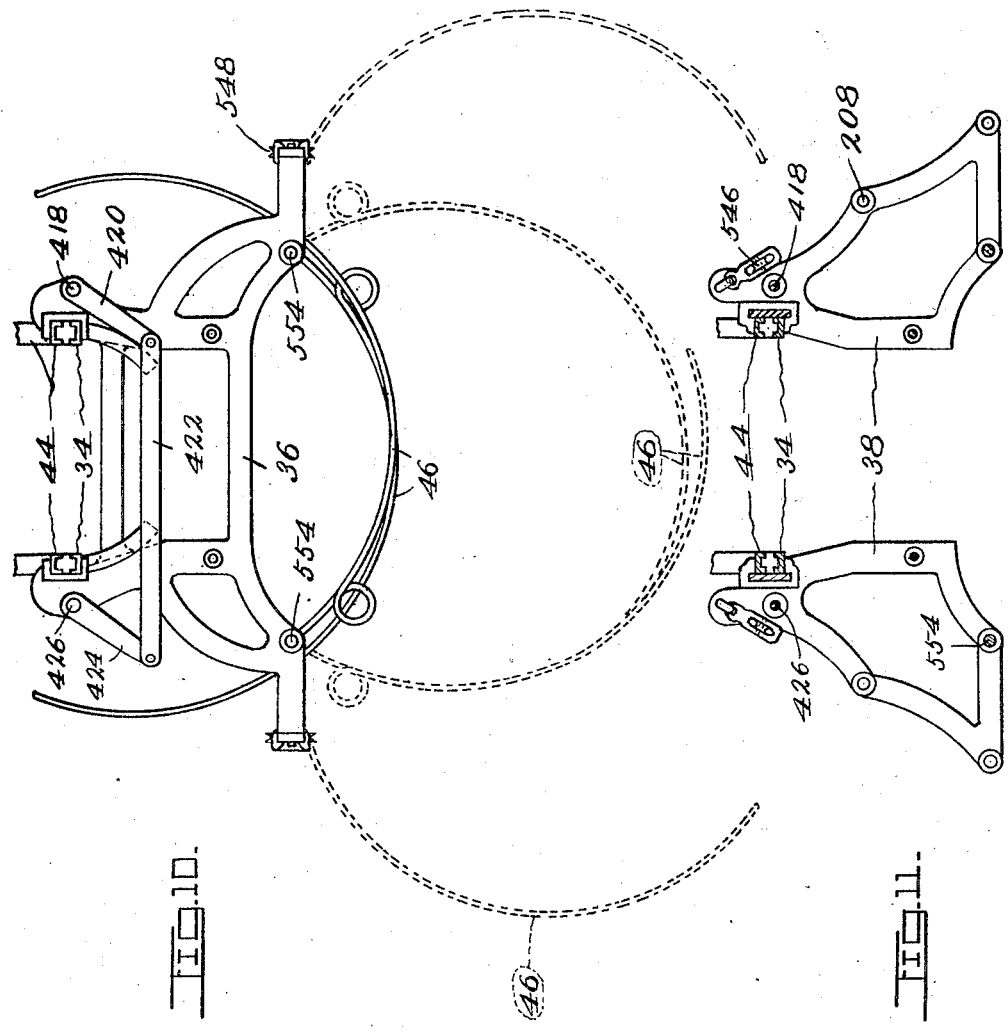

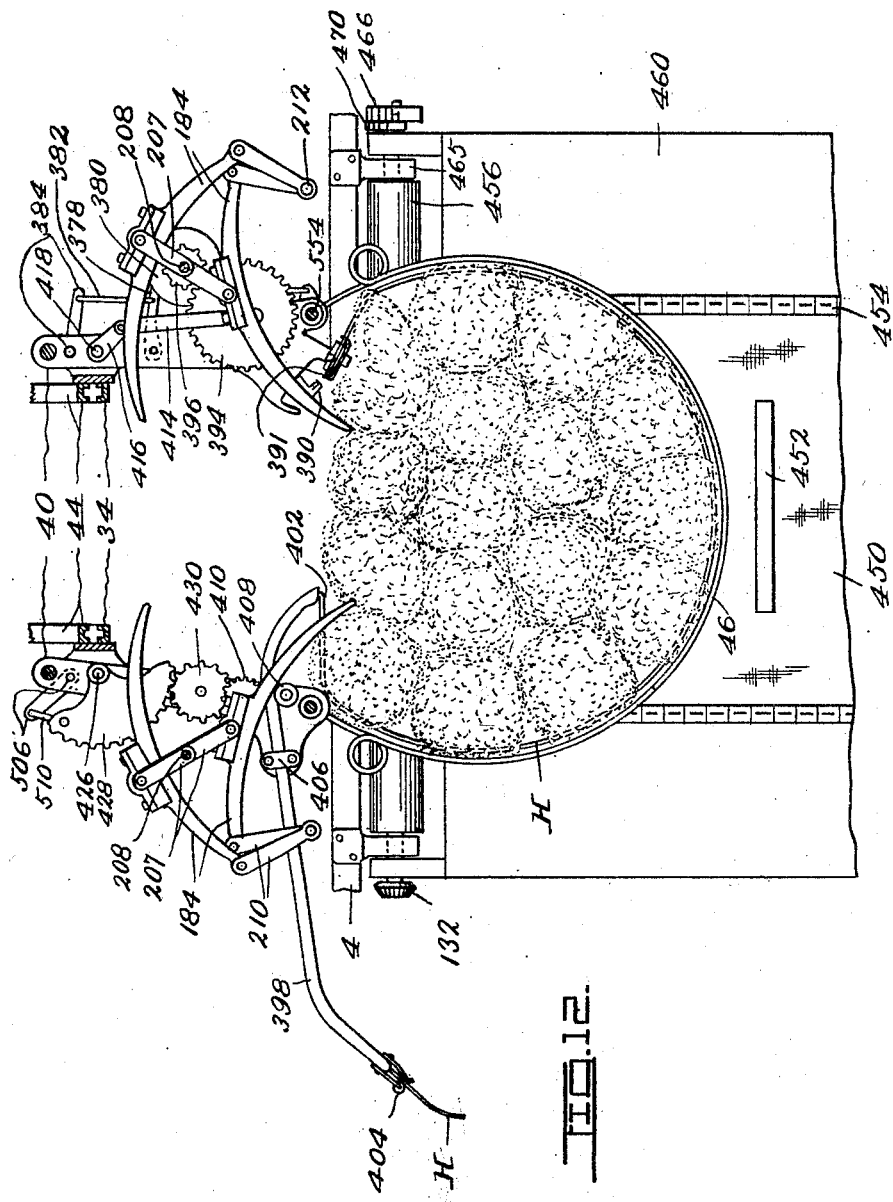

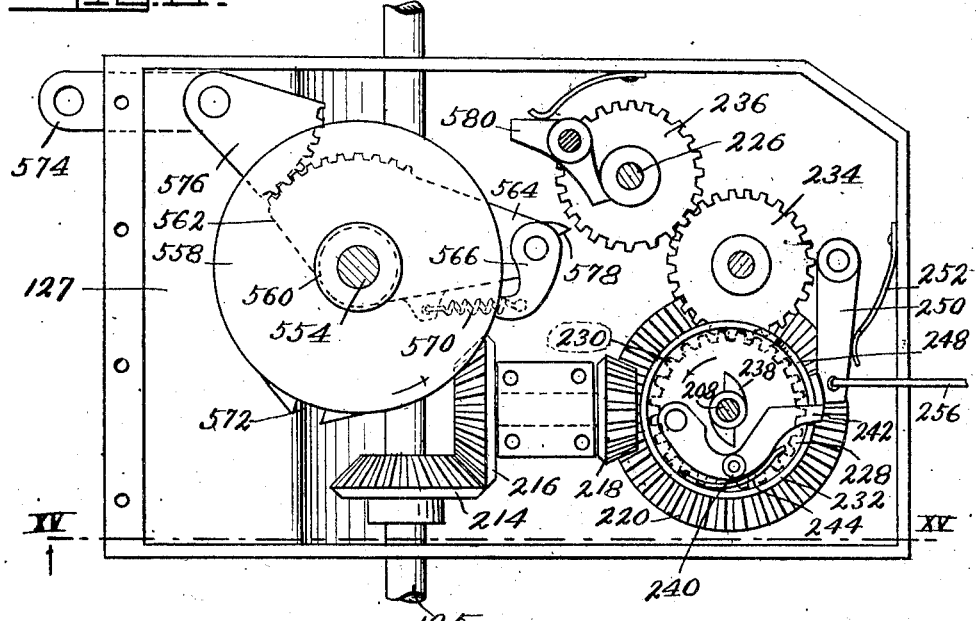
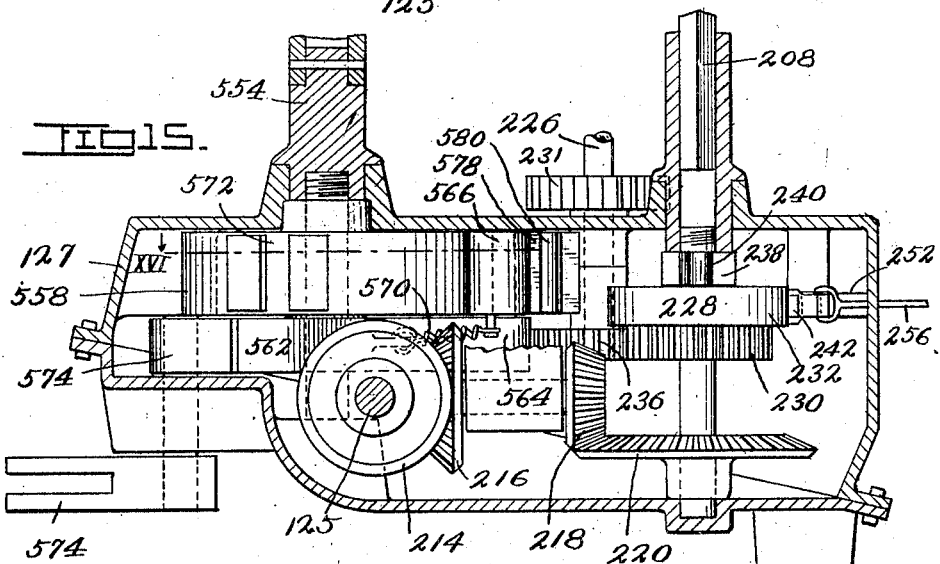
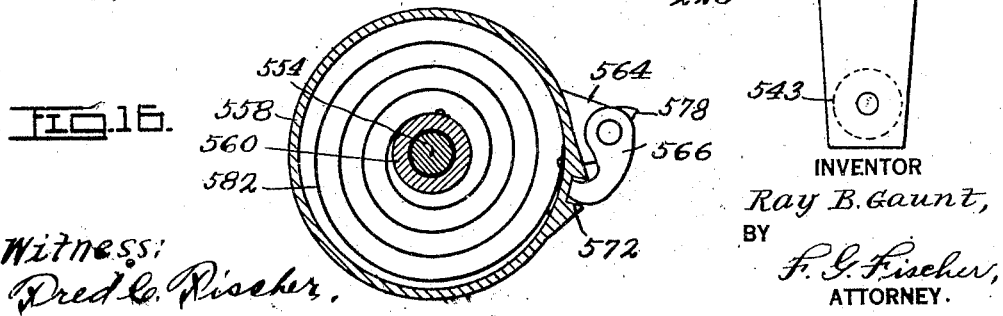

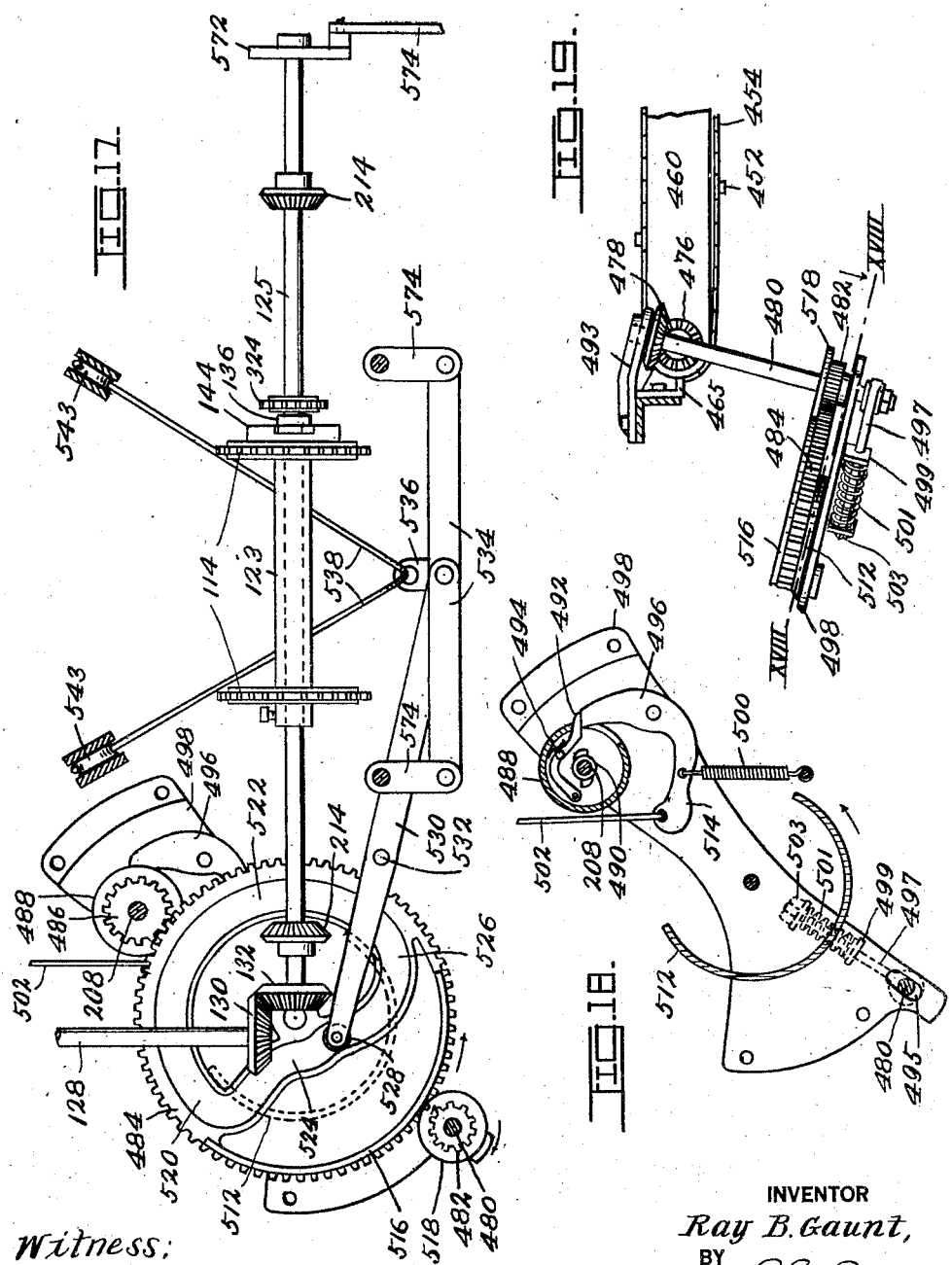

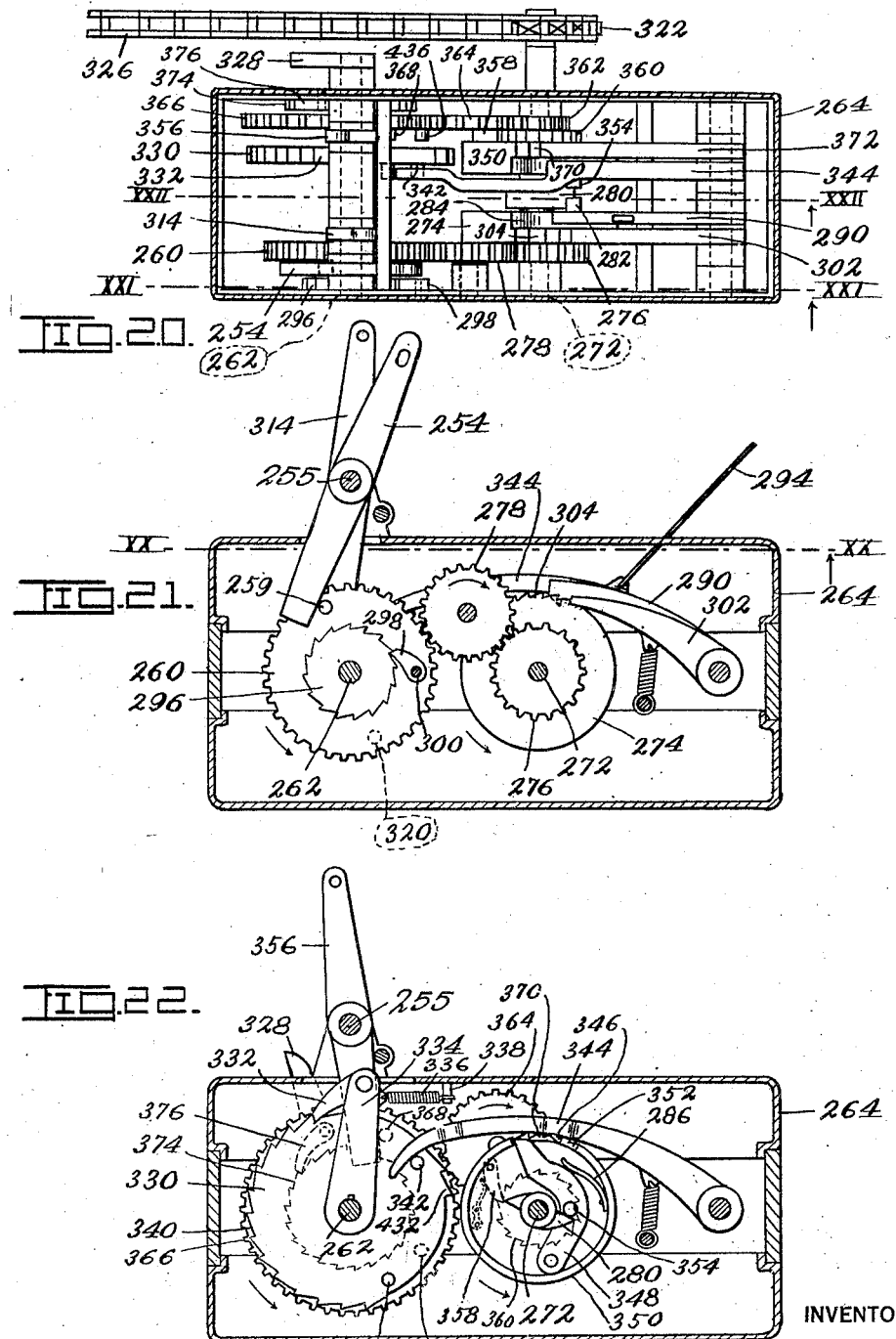

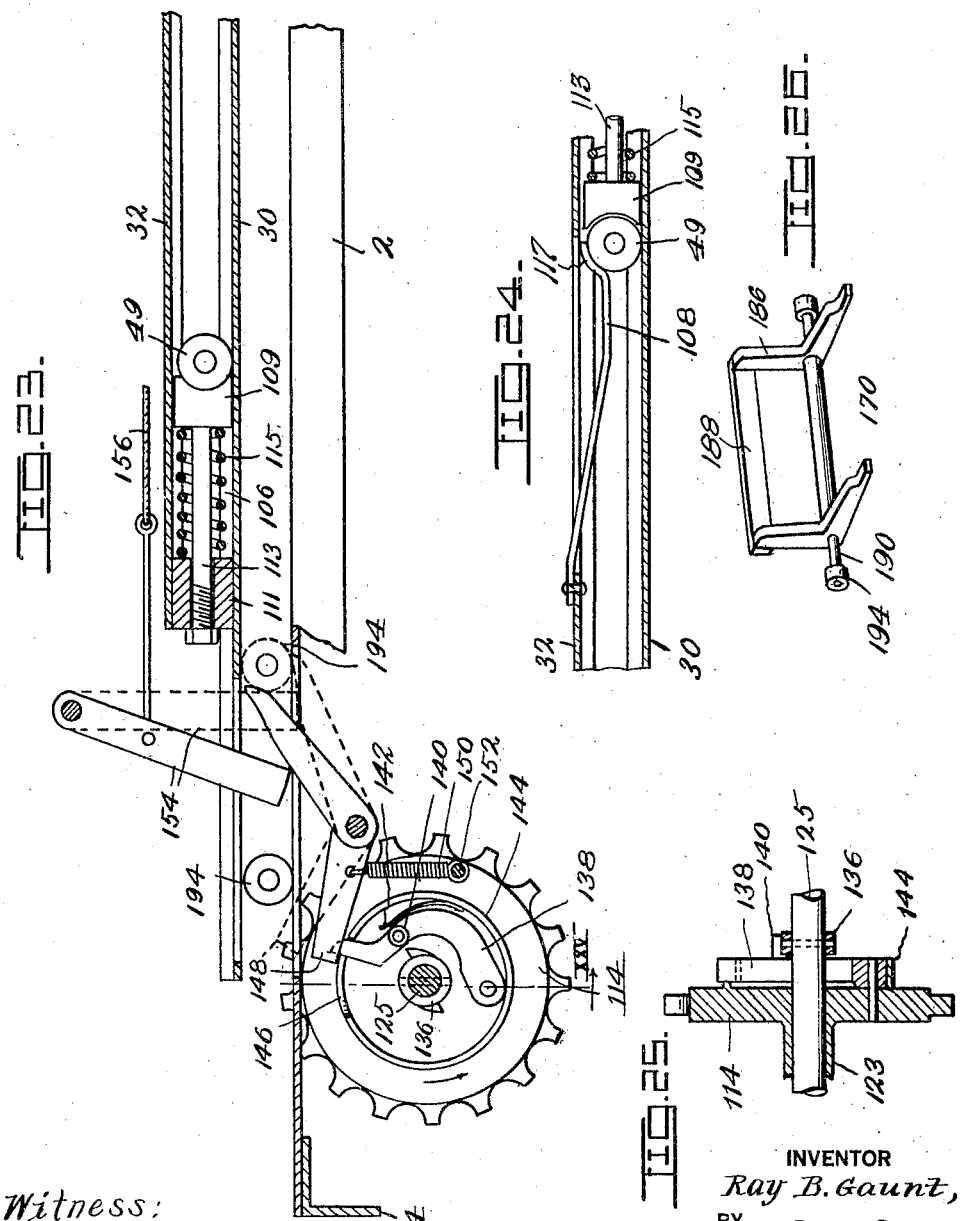

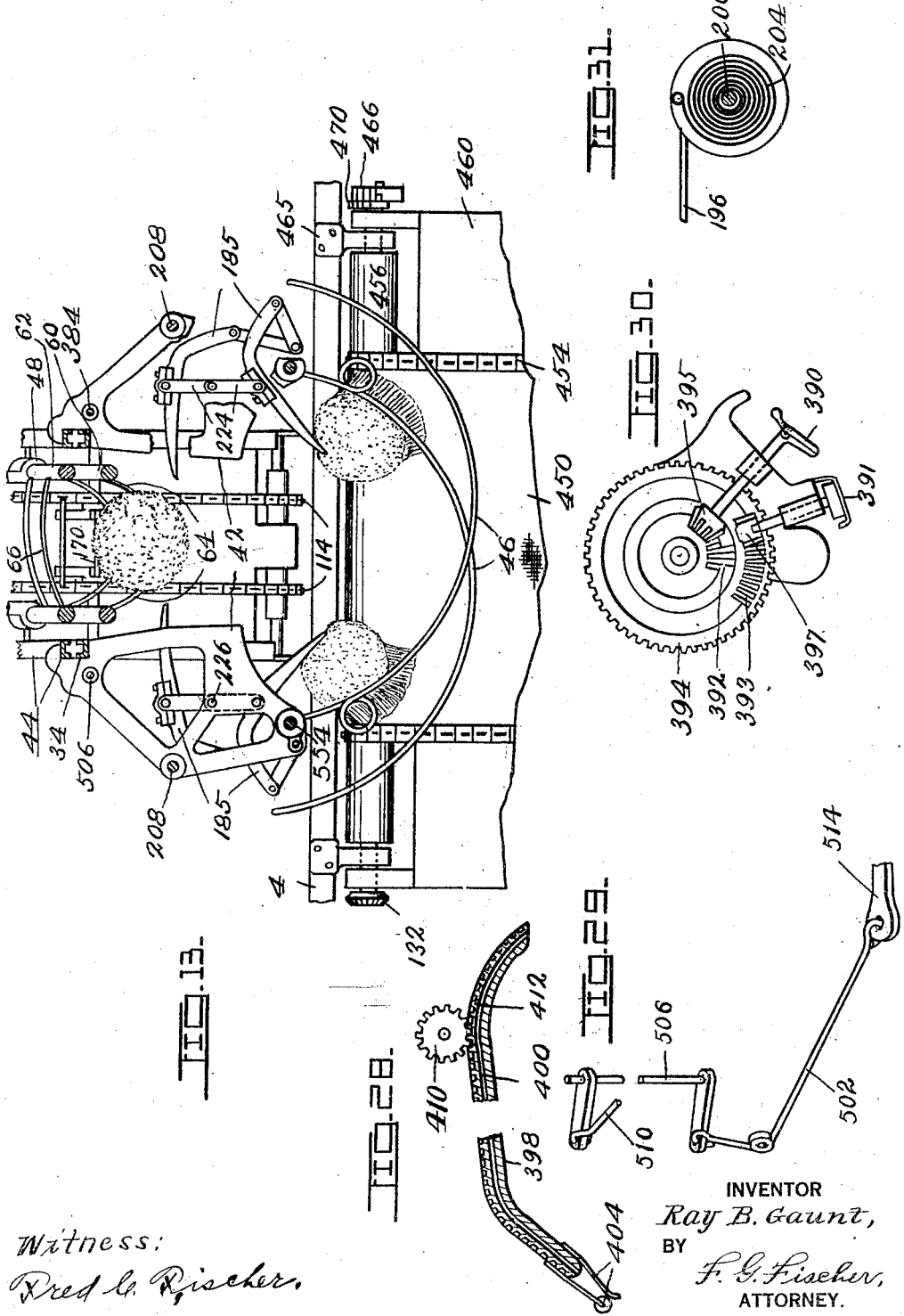

Patented Apr. 7, 1925.

1,532,132

UNITED STATES PATENT OFFICE.

RAY B. GAUNT, OF BRECKENRIDGE, MISSOURI.

GRAIN SHOCKER.

Application filed September 26, 1921. Serial No. 503,304.

*To all whom it may concern:*

Be it known that I, RAY B. GAUNT, a citizen of the United States, residing at Breckenridge, in the county of Caldwell and State of Missouri, have invented certain new and useful Improvements in Grain Shockers, of which the following is a specification.

My invention relates to grain shockers of a character adapted to be coupled to and driven with a grain binder, said shocker receiving the bound bundles of grain from the binder, forming said bundles into a shock, binding said shock, and then depositing the shock upon the ground in a standing position.

The invention also embodies mechanism for lowering the shock in order to assist in depositing the same squarely upon its butt into the stubble, said mechanism being automatic and requiring no attention on the part of the driver of the binder.

The invention also provides means for depositing cap bundles with each shock for protection of the latter against the weather while standing in the field.

Further objects and advantages of the invention will be set forth in the following detailed description and the appended claims, reference being had to the accompanying drawings, in which:—

Fig. 1 is a side elevation of the shocker with some parts removed.

Fig. 2 is a broken plan view of the rear portion of the machine, with some of the parts removed.

Fig. 3 is a continuation of Fig. 2, on a slightly enlarged scale.

Fig. 4 is a cross section on line IV—IV of Fig. 3.

Fig. 5 is a cross section on line V—V of Fig. 3.

Fig. 6 is a broken plan view of a portion of the shocker attached to a portion of a grain binder.

Fig. 7 is a broken detail, partly in section, showing a slip joint constituting a portion of the shaft whereby motion is transmitted from the grain binder to certain parts of the shocker mechanism.

Fig. 8 is a broken vertical section with some of the parts added, and taken on line VIII of Fig. 2.

Fig. 9 is a detail perspective view of the bundle carrier.

Fig. 10 is a plan view of the shock forming mechanism and some of the associated parts, and showing in full and dotted lines the different positions assumed by the shock forming arms.

Fig. 11 is a cross section on line XI—XI of Fig. 1.

Fig. 12 is a broken cross section on line XII—XII of Fig. 1.

Fig. 13 is a broken cross section on line XIII—XIII of Fig. 8.

Fig. 14 is an enlarged plan view of one of a pair of gear cases with its upper portion removed to show the interior mechanism.

Fig. 15 is a vertical longitudinal section on line XV—XV of Fig. 14, with the top of the case added.

Fig. 16 is a horizontal section of a housing and associated parts on line XVI of Fig. 15.

Fig. 17 is a plan view of a transverse shaft and associated mechanism constituting important features of the invention.

Fig. 18 is a cross section on line XVIII—XVIII of Fig. 19.

Fig. 19 is a broken side elevation of the shock conveyer and a portion of the driving mechanism therefor.

Fig. 20 is a longitudinal section on line XX—XX of Fig. 21, showing two controlling units, one for determining the number of bundles to enter into the formation of each shock, and the other for controlling the operation of certain packer mechanism.

Fig. 21 is a longitudinal section taken on line XXI—XXI of Fig. 20, showing the controlling unit for the packer mechanism.

Fig. 22 is a longitudinal section taken on line XXII—XXII of Fig. 20, showing the unit for determining the number of bundles to enter into each shock.

Fig. 23 is an enlarged longitudinal sectional view of a trip clutch and associated parts for controlling the operation of the endless sprocket mechanism which moves the loaded bundle carrier to the shock-forming mechanism.

Fig. 24 is a detail partly in section of the shock absorbers at the forward portion of the machine.

Fig. 25 is a vertical section on line XXV of Fig. 23.

Fig. 26 is a detail perspective of one of a pair of followers forming part of the invention.

Fig. 27 is a broken end elevation partly in section of latch means for securing the upper arms of the bundle carrier in closed position.

Fig. 28 is a detail longitudinal section of the needle and gear wheel for driving the same.

Fig. 29 is a fragmentary detail perspective of certain detent controlling mechanism.

Fig. 30 is an inverted plan view of the twine-knotting and severing mechanism and a portion of the actuating train.

Fig. 31 is a detail of spool mechanism and a spiral spring for turning the spools in a direction to wind cables thereon.

In carrying out the invention, I employ a frame embodying parallel longitudinal members 2, a cross bar 4 fixed to the rear ends of said longitudinal member 2, and braces 6 extending from the rear portions of the longitudinal members 2 to the ends of said cross bar 4. The frame is mounted at its rear portion upon two casters 8 and at its forward portion upon a caster 10, the spindle of which latter is swiveled in the bearing 12 at one end of a transverse bar 14 connected by a pivot 16 to the frame A of the binder, a portion of which latter is disclosed by Fig. 6.

The bar 14 extends beneath the frame and is connected by a pivot 18 to a pair of oppositely disposed members 20, depending from a plank 22 secured to the two longitudinal members 2 of the frame by transverse U-shaped bars 24. By thus mounting the caster 10 it is free to move vertically over uneven ground independently of the grain binder frame A, to which the shocker is connected by a draft bar 26 and a brace 28, which latter coacts with the bar 14 in holding the shocker in proper relation to the delivery apron C of the grain binder.

The frame of the shocker is reinforced by a track consisting of two oppositely-disposed parallel rails 30 spaced slightly above the longitudinal frame members 2 and fixed to the upturned ends of the transverse bars 24. Said rails 30 consist preferably of channel bars above which similar bars 32 are supported in inverted position by the transverse bars 24 to prevent the rear rollers of the bundle carrier, hereinafter described, from leaving the rails 30.

The channel bars 32 are surmounted by a curved track consisting of two oppositely-disposed rails 34, which extend rearwardly and upwardly to an almost perpendicular position. The curved rails 34 are, preferably, made of channel bars and are fixed to superimposed frame members 36, 38, 40 and 42. The curved rails 34 are paralleled by a pair of reversely disposed channel bars 44 which are also secured to the frame members 36, 38, 40 and 42, to prevent the forward rollers of the bundle carrier from leaving said rails 34. The frame members 38, 40 and 42, are arranged in pairs which are spaced apart as disclosed by Figs. 11 to 13, inclusive, to leave a passageway for the bundles of grain as they are carried backwardly into shock forming arms 46, hereinafter described in detail.

The bundles of grain are delivered from the apron C of the grain binder into the bundle carrier 48, above referred to and which is mounted upon rollers 49, one pair of which traverse the rails 30 and the other pair the rails 34. The bundle carrier 48, best shown by Figs. 3, 4, 5 and 9, carries the bundles to the shock forming arms 46, and comprises two end members 50 spaced apart and united at their upper terminals by a yoke 52, a transverse end member 54, a longitudinal bar 56 secured at one end to one of the end members 50 and at its opposite end to the transverse end member 54, a rock shaft 58 spaced beneath the bar 56, and superimposed rock shafts 60 and 62. The rock shafts 58, 60 and 62, are journaled in the respective end members 50 and the transverse end members 54 and constitute the two longitudinal sides of the carrier 48. The rock shafts 58 and 60 are provided with fingers 64 which form the bottom of the carrier 48, and the rock shaft 62 is provided with arms 66 which constitute the top of said carrier 48. The rock shafts 58 and 60 in addition to being provided with fingers 64, are also provided with arms 68 and 70, respectively, which perform the dual functions of guiding the bundles into the carrier 48 as they are discharged from the grain binder and assist in expelling said bundles when the shock forming arms 46 are reached.

The rock shafts 58 and 60 are normally held in position to retain the fingers 64 in closed position through the intermediacy of segmental gears 72 and 74, which intermesh with segmental gears 76 and 78 mounted upon shafts 80 and 82 journaled in the end member 54 and controlled by cranks 84 and 86 normally held by coil springs 88 and 90, respectively, against the curved channel bars 44. As the bundle carrier 48 reaches the end of its backward and upward movement, Fig. 8, the cranks 84 and 86 are carried above the upper ends of the rails 34 against the action of the respective springs 88 and 90 as the bundle in its passage to the shock forming arms 46, forces the fingers 64 to open position. After the passage of the bundle the springs 88 and 90 immediately restore the cranks 84 and 86 to normal position against the channel bars 44, the upper ends of which extend slightly above the upper ends of the curved rails 34 to check said arms 84 and 86, as they move to normal position.

When the carrier 48 is in position to receive a bundle from the grain binder the arms 66 are held in open position, Figs.

3 and 5, through the action of a coil spring 92 connected at one end to the rock shaft 62 and at its opposite end to the transverse end member 54. As the carrier 48 starts backward toward the shock forming arms 46 with a bundle the shaft 62 is rocked against the action of the spring 92 to close the arms 66 and cause them to cooperate with the fingers 64 in holding the bundle, by a laterally projecting arm 94, fixed to said rock shaft 62, and a curved guide 96 disposed above the channel bars 32, Figs. 1 and 3. The arm 94 is provided with an antifriction roller 98 which travels on the guide 96 and is raised thereby until the shaft 62 is rotated approximately one-quarter of a revolution, in which position it is then held by a stop 100, fixed to the rock shaft 62, and a latch 102 pivotally mounted on the yoke 52 and yieldably held in the path of said stop 100 by a coil spring 104. The latch mechanism holds the rock shaft 62 in the last-mentioned position until the carrier 48 travels to the end of its backward movement and returns to initial position for another bundle, whereupon the latch 102 contacts a transverse bar 105 at the rear ends of the channel bars 32, and is thus caused to release the stop 100. The rock shaft 62 is then actuated by the spring 92 and opens the arms 66 to receive another bundle. This movement of the rock shaft 62 also swings the arms 94 downwardly until checked by the roller 98 contacting the guide 96.

The bundle carrier 48 is relieved of undue shock on reaching the ends of its travel by shock absorbers best shown by Figs. 23 and 24 and two pairs 106 and 108 of which are placed at the forward ends of the rails 30, while another pair 106 is placed adjacent to the rear ends of said rails 30. The shock absorbers 108 consist of curved springs fixed at one end to the channel bars 32 and curved downwardly and forwardly through slots in said channel bars 32 to contact the rollers 49 and check the speed thereof before they contact the second set of shock absorbers 106, which consist of buffers 109, guides 111, rods 113 fixed to the buffers 109 and slidably arranged in the guides 111, and coil springs 115 interposed between the buffers 109 and the guides 111. As the rollers 49 contact the buffers 109 and compress the springs 115, they are prevented from unduly rebounding on the recoil of said springs 115 by the upturned ends 117 of the springs 108, which stop the bundle carrier 48 in proper position to receive a bundle from the grain binder.

The bundle carrier 48 is moved backwardly and upwardly by sprocket mechanism which pauses while said bundle carrier 48 delivers a bundle to the shock forming arms 46 and returns to receive another bundle. In carrying out said sprocket mechanism I employ a pair of endless sprocket chains 110 running around sprocket wheels 112 and 114. The sprocket wheels 112 are fixedly-mounted upon a transverse shaft 116 journaled in bearings 118 provided with rearwardly extending rods 120 slidably mounted in guides 122 at the forward portion of the shocker. Springs 124 are interposed between the bearings 118 and the adjacent guides 122 to take up slack in the sprocket chains 110.

The sprocket wheels 114 are united by a tubular shaft 123 loosely mounted upon a transverse shaft 125 journaled in two oppositely-disposed gear cases 127 fixed to the rear portion of the shocker frame and disposed at opposite sides of the track formed by the rails 30, Figs. 2 and 6. When the shocker is in operation the shaft 125 is constantly driven from a shaft D of the grain binder, through a train of spur gears 126 and 129, a shaft 128, and bevel gears 130 and 132. Clutch mechanism 133 is provided for stopping the aforementioned train at the option of the driver of the grain binder. The shaft 128 is rendered flexible by universal joints 134 and a slip joint 135, similar to the joint 167, Fig. 7, so that it may accommodate itself to independent vertical movement between the grain binder and the shocker when traveling over uneven ground.

A trip clutch is provided for causing the tubular shaft 123 to rotate with the shaft 125 and effect the operation of the sprocket mechanism. Said clutch is shown in detail by Fig. 23, and comprises a dog 136 fixed to the shaft 125, a clutch lever 138 pivoted to one of the sprocket wheels 114, a laterally projecting roller 140 mounted on said clutch lever 138, a spring 142 to press the clutch lever 138 towards the shaft 125, so that the rotary dog 136 may engage the roller 140, and a housing 144, formed integral with one side of one of the sprocket wheels 114 and having a recess 146 in which the free end of the clutch lever 138 swings and the end walls of which restrict the pivotal movements of said clutch lever. A detent 147 engaging one of the sprocket wheels 114, Fig. 8, prevents retrograde movement of the sprocket mechanism when the trip clutch is thrown out of gear.

The clutch lever 138 is held in the full line position shown by Fig. 23, by a detent 148, so that the sprocket mechanism will pause during the interval that the bundle carrier 48 returns from its raised position, Fig. 8, to the forward end of the shocker to receive another bundle. The detent 148 is drawn into engagement to intercept the clutch lever 138 after each revolution of the sprocket wheels 114, by a coil spring 150, connected at one end to said detent 148 and at its opposite end to a pin 152 fixed to the adjacent side of the gear case 127. In the present instance the sprocket wheels 114 are so proportioned that each revolution thereof will cause the sprocket chains 110 to travel one-half revolution.

The detent 148 is disengaged from the clutch lever 138 by a trip lever 154, as indicated by dotted lines, Fig. 23, to allow the trip clutch to drive the sprocket mechanism. Said trip lever 154 is actuated to disengage the detent 148 from the clutch lever 138 as a bundle is discharged from the grain binder into the carrier 48, by a cable 156 and a crank shaft 160, which latter is provided at one end with a crank 162 to which the forward end of the cable 156 is attached, and at its opposite end with a crank 164 arranged in the path of one of the rotary arms E of the grain binder which kick the bundles from the apron C into the carrier 48. After being actuated by the arm E the crank shaft 160 is restored to normal position by a coil spring 161 and a cable 163, Figs. 1 and 6. The shaft 160 like the shaft 128 is rendered flexible by universal joints 166 and a slip joint 167, whereby it may lengthen and shorten to permit independent vertical movement between the grain binder and the shocker in passing over uneven ground. The shaft 160 is high enough to allow the carrier 48 to freely pass thereunder.

The parts remain in dotted line position, Fig. 23, as the loaded bundle carrier 48 is forced backwardly and upwardly by a set of dogs 168 and a follower 170. Two sets of dogs 168 and two followers 170 are provided in the present instance and the two sets of dogs are spaced to equally divide the two sprocket chains into two parts. Each set of dogs 168 is pivotally mounted upon a transverse rod 172 fixed in ears 174 on the sprocket chains 110. As the dogs 168 are carried backwardly by the chains 110 they engage studs 180 projecting from the end members 50 of the carrier 48 and force said carrier to within a short distance of the end of its backward and upward travel when the arms 178 drop through slots 182 in the plank 22 and rock the upper portions of the dogs downwardly out of engagement with the studs 180. Almost immediately after the dogs 168 rock out of engagement with the studs 180, the bundle carrier 48 is forced to the end of its backward and upward travel by the adjacent follower 170 which engages the lower portion of the bundle in the carrier 48 and in continuing its movement forces said bundle to open the fingers 64 and pass between two sets of upper packers 184 and two sets of lower packers 185, hereinafter described in detail and which force the bundle into the shock-forming arm 46. Each follower 170 is spaced a short distance behind each set of dogs 168. The followers 170 are somewhat similar in construction to the dogs 168 and each consists of two angular end members 186, Fig. 26, united by a transverse member 188 pivotally mounted upon a shaft 190 connected to ears on the sprocket chains 110. The shaft 190 is provided at its ends with rollers 194, which traverse the upper surface of the longitudinal frame members 2 and one of which engages the trip lever 154, throwing it out of engagement with the detent 148, thus stopping the sprocket mechanism after the chains 110 have made a half revolution and until the carrier 48 has received another bundle from the grain binder. When the sprocket mechanism stops, the succeeding set of dogs 168 are in position to move the carrier 48 backward and upward with said other bundle.

The bundle carrier 48 is restored to initial position to receive the bundle, through the force of gravity and cables 196, which latter are attached to said carrier 48 and a pair of spools 198 fixed upon a shaft 200, journaled in bearings 202 secured to the frame members 2 and the channel bars 32. The cables 196 are wound upon the spools 198 through the intermediacy of a spiral spring 204, fixed at one end to the shaft 200 and at its opposite end to the adjacent bearing 202.

Referring now in detail to the upper set of packers 184, which cooperate with the followers 170 and are disposed at opposite sides of the passageway through which the bundles pass to the shock-forming arms 46, each set consists of two packers 184, Figs. 8 and 12, which are actuated by the diametrically-opposed cranks 207 at the upper end of a shaft 208 journaled in the associate frame members 40 and 42 and the underlying gear case 127. The rear ends of the packers 184 are connected to links 210 pivoted to stub shafts 212 depending from the adjacent frame members 38. As the crank shaft 208 rotates an alternating forward thrust movement is imparted to the packers 184. Each shaft 208 is driven from the transverse shaft 125 through bevel gears 214, 216, 218 and 220, Figs. 14 and 15.

The lower packers 185, Figs. 8 and 13, like the upper packers 184, are arranged in two sets disposed at opposite sides of the passageway through which the bundles pass to the shock-forming arms 46. Each set of packers 185 is given an alternate forward thrust movement through the intermediacy of the diametrically opposed cranks 224 at the upper end of a shaft 226 journaled in the associated frame member 42 and underlying gear case 127. Each shaft 226 is driven from the adjacent shaft 208 through a train in the associate gear case 127, Figs. 14 and 15, comprising a trip clutch 228, a spur gear 230 integral with the underside of the housing 232 of said trip clutch 228, an intermediate spur gear 234, and a spur gear 236 which latter is fixed to the lower end of the shaft 226. The spur gear 230 and the housing 232 are loose on the shaft 208, but are driven at the proper time by a dog 238, fixed to said shaft 208, and the roller 240 on a clutch lever 242 pivoted in the housing 232 and yieldably pressed toward the dog 238 to carry the roller 240 into the path thereof by a spring 244. The pivotal movement of the lever 242 is limited by the end walls of a recess 248 in the periphery of the housing 232.

The respective trip clutches 228 are alternately thrown out of gear to stop the packers 185, by detents 250, which latter are yieldably forced against the peripheries of the housings 232 by springs 252 to engage the free ends of the respective clutch levers 242 and force them inwardly until the rollers 240 are thrown out of engagement with the rotary dogs 238. When the respective trip clutches 228 are thrown out of gear the packer shafts 226 are held from backward rotation by pawls 229 and ratchet wheels 231. The detent 250 in the gear case 127 at the right side of the shocker (looking forward) is controlled by a trip lever 254 to which it is connected through the intermediacy of a cable 256 and a coil spring 258, Figs. 1 and 6.

The trip lever 254 is mounted upon a shaft 255 and constitutes a part of the following described packer control mechanism: 259 designates a roller for intermittently actuating said trip lever 254. Said roller 259 projects laterally from a spur gear 260 loosely mounted upon a rock shaft 262 journaled in a case 264, Figs. 20 to 22, inclusive. The spur gear 260 is driven at intervals from a shaft 272 through a train located in the case 264 and consisting of a trip clutch 274, a spur gear 276 integral with said trip clutch 274, and an intermediate spur gear 278. The trip clutch 274 is of the same type shown by Fig. 22, and hereinafter described in detail. Said trip clutch 274 and the spur gear 276 are loose upon the shaft 272, but are caused to rotate therewith at intervals through the intermediacy of a rotary dog 280, fixed upon the shaft 272 and adapted to engage a roller 282 projecting laterally from the clutch lever 284.

The clutch lever 284 is thrown out of gear with the dog 280 after completing each revolution by a detent 290, which is controlled by a cable 294 attached to the crank 162 of the shaft 160. Backward rotation of the aforementioned train of gearing is prevented when the trip clutch 274 is thrown out of gear, by a ratchet wheel 296 fixed to the spur gear 260, a pawl 298 mounted upon a pin 300 projecting inwardly from the case 264, a pawl 302, and peripheral ratchet teeth 304 on the periphery of the trip clutch 274.

The packer shafts 208 and 226 on the left side of the shocker are driven by gearing in the associate gear case 127, which is a duplicate of the gearing mounted in the case 127 at the right side of the shocker, excepting that it is driven in a reverse direction by a bevel gear 214 on the left side of shaft 125, to drive the associate shafts 208 and 226 in opposite directions from those on the right hand side and actuate the packers 185 accordingly.

The detent 250 in the left gear case 127 is thrown out of engagement with the associate clutch lever 242 by a cable 306, which is connected at its outer end to the crank 308, Fig. 6, at one end of a transverse rock shaft 310, journaled beneath the frame members 2 and provided at its opposite end with a crank 312 to which a trip lever 314 of the packer controlling unit is yieldably connected through the intermediacy of a cable 316 and a coil spring 318. The trip lever 314 is mounted upon the shaft 255 and extends downwardly into the path of a roller 320 on the opposite side of the spur gear 260 from the roller 259. The rollers 259 and 320 are diametrically disposed on the spur gear 260, as shown by Fig. 21. With the foregoing mechanism arranged as shown and described it is apparent that as the spur gear 260 makes a half revolution it will actuate the lever 254, which, through the intermediacy of the intervening mechanism, stops the packers 185 at the right side of the machine, and on making another half revolution will actuate the trip lever 314, which, through the intermediacy of the intervening parts, will stop the packers 185 at the left side of the machine, thus insuring the alternate operation of said packers 185, so that one set will move one bundle towards the right side of the shock-forming arms 46, while the other will move the following bundle to the left side of said shock-forming arms and thus properly distribute the bundles and insure a symmetrical shock.

The shaft 272 is constantly driven from the shaft 125 by sprocket wheels 322 and 324, respectively, and an endless sprocket chain 326.

The same number of bundles are caused to enter each shock by the following described tally mechanism, reference being had more particularly to Figs. 20, 21 and 22: As each follower 170 follows the loaded bundle carrier 48 backwardly towards the shock-forming arms 46 the roller 194 adjacent the left side of the shocker runs over and depresses a lever 328 fixed to the rock shaft 262, causing the same to advance a mutilated ratchet wheel 330 one step through the intermediacy of a pawl 332 and a rocker arm 334, which latter is fixed to the shaft 262. The pawl 332 and the rocker arm 334 are then restored to normal position by a coil spring 336, connected to the rocker arm 334 and a pin 338, which latter depends from the upper inner side of the case 264.

The operation of advancing the ratchet wheel 330 step by step is repeated as each bundle is carried back to the shock-forming arms 46 until the last ratchet tooth in the group 340 is advanced by the pawl 332, which operation carries a laterally projecting roller 342 on one side of the ratchet wheel 330, into engagement with a detent 344 and raises the hook 346 thereof out of engagement with the clutch lever 348 of a trip clutch 350 loosely mounted upon the shaft 272, beside the companion trip clutch 274. The instant the hook 346 releases the clutch lever 348 the same is forced by the spring 286 to the opposite wall of the recess 352 and carries the laterally projecting roller 354 into the path of the rotary dog 280 which causes the trip clutch 350 to rock a lever 356, through a train comprising a pawl 358 pivotally mounted on one side of the trip clutch 350, a ratchet wheel 360 loosely mounted upon the shaft 272, a small spur gear 362 fixed to the ratchet wheel 360, an intermediate spur gear 364, and a large spur gear 366 loosely mounted upon the shaft 262 and provided with a laterally projecting roller 368 which engages and rocks the lever 356 at each revolution of the large spur gear 366.

After the large spur gear 366 makes a partial revolution and rocks the trip lever 356, the train which drives said spur gear 366 is thrown out of gear by the detent 344, which intercepts the clutch lever 348 and disengages the roller 354 from the dog 280 as the trip clutch 350 completes a revolution. Backward rotation of the train is prevented by peripheral teeth 370 on the housing of the trip clutch 350, a pawl 372 coacting with said peripheral ratchet teeth 370, a ratchet wheel 374 fixed to the hub of the spur gear 366, and a pawl 376 mounted on a pin projecting from the adjacent wall of the case 264.

As the lever 356 is tripped as above stated it throws the shock binding mechanism in gear for the purpose of binding the shock with twine H, as follows: As the upper end of the trip lever 356 swings to the right, Fig. 1, it throws a detent 378 out of gear with a trip clutch 380 through the intermediacy of a link 382, a crank shaft 384, and a cable 386. The detent 378 and the trip clutch 380 are identical in construction and operation to those hereinbefore described and one of which is disclosed by Fig. 14, so that a detail description thereof is deemed unnecessary. As the detent 378 is disengaged from the clutch lever corresponding to the lever 242, a rotary dog 388 corresponding to the dog 238 and fixed upon the packer shaft 208 drives said trip clutch 380, which in turn rotates a knotter 390 and twine severing blades 391 as follows: A pinion 396 fixed upon the trip clutch 380 drives a spur gear 394 provided at its underside with two mutilated sets of bevel teeth 392 and 393. The teeth 392, at each revolution of the spur gear 394, rotate a small bevel wheel 395 which actuates the knotter 390, while the teeth 393 rotate a small bevel wheel 397 which drives the blades 391, Figs. 12 and 30.

The detail construction of the knotter 390 and the blades 391 has not been shown as it is of a well-known type in the art and I deem it sufficient for the purpose of the present invention to merely indicate the position of the same and to show a driving means therefor from the remainder of the mechanism.

A needle 398 acts in conjunction with the knotter 390 and the blades 391 in the usual well-known manner. The needle 398, however, is of novel construction, having a longitudinal passageway 400 for the twine or string H, and tensioning means 404 to prevent the twine H from becoming slack between said needle 398 and the knotter 390.

The needle 398 is reciprocably mounted in a guide 406 and between a flanged guide roller 408 and a spur gear 410, which latter intermeshes with rack teeth 412 on the adjacent longitudinal side of the needle 398 for the purpose of moving the same over to the knotter 390 and then back to initial position. An alternating rotary motion is imparted to the spur gear 410 from the spur gear 394 through the intermediacy of a pitman 414, a crank 416 on a rock shaft 418, a crank 420 also on the rock shaft 418, a connecting rod 422, a crank 424, a rock shaft 426, a segmental gear 428, and an intermediate gear 430. The rock shafts 418 and 426 are disposed at opposite sides of the machine and journaled in the frame members 36, 38 and 40, while the connecting bar 422 extends above the frame member 36 to clear the bundles as they pass to the shock-forming arms 46, Figs. 1, 10 and 12.

After the shock has been bound as described, two cap bundles of grain are bound together by the same mechanism which bound said shock. After being bound together the two cap bundles are forced into the shock-forming arms 46 in order to be delivered upon the ground with the shock, so that a farmer following the shocker may use the two bundles for capping said shock.

When binding the two cap bundles the binding mechanism is controlled by the tally mechanism as follows: When the large spur gear 366, Fig. 22, is driven a partial revolution as hereinbefore stated it carries the ratchet wheel 330 therewith and the first of a group of two ratchet teeth 432 is brought into engagement with the forward end of the pawl 332, which advances the ratchet wheel 330 two consecutive steps, one step for each cap bundle. During this time a roller 434 following the roller 342 on the ratchet wheel 330, raises the detent 344 out of engagement with the clutch lever 348, so that the trip clutch 350, through the intermediacy of the hereinbefore described trains of gearing and a roller 436 following the roller 368 on the large spur gear 366, trips the lever 356 which sets the binding mechanism in operation to bind the two cap bundles together by disengaging the detent 378 from the trip clutch 380.

As the bundles for forming a shock are forced into the shock-forming arms 46 the lower ends of said bundles pass upon an endless conveyer 450 provided at intervals with transverse slats 452 and reinforced at its margins with endless sprocket chains 454. The endless conveyer 450 travels around rollers 456 and 458 mounted in the forward and rear ends, respectively, of a dump platform 460 terminating at its rear end in two runners 461. The rollers 456 and 458 are provided with sprocket teeth 462 and 464 around which the sprocket chains 454 travel and are driven by the sprocket teeth 462. The forward roller 456 is also journaled in bearings 465 fixed to the transverse frame member 4, and thus supports the dump platform 460.

During the time that the shock-forming arms 46 are being supplied with bundles for a shock the endless conveyer 450 is intermittently actuated to carry said bundles backward and assist the packers 184 and 185 in packing the bundles in said shock-forming arms, by a ratchet wheel 466 mounted upon one end of the roller 456, a pawl 468 for rotating said ratchet wheel 466 step by step, a lever 470 rockably mounted upon the roller 456 and carrying the pawl 468, a disk 472 fixed upon one end of the shaft 125, and a pitman 474 for transmitting motion from said disk 472 to the lever 470, Figs. 1 and 2.

After the shock has been completed and bound and the two cap bundles have been forced into the shock-forming arms 46 against the bound shock, said arms 46 are suddenly opened by mechanism hereinafter described, the speed of the endless conveyer is accelerated and the dump platform 460 is lowered until the runners 461 travel upon the ground to discharge the shock and the two cap bundles in a standing position. The speed of the endless conveyer 450 is accelerated as stated by a train of gearing consisting of a bevel gear 476 fixed to one end of the forward roller 456, an intermeshing bevel gear 478 fixed to the upper end of a shaft 480, a small spur gear 482 fixed to the lower portion of the shaft 480, an intermeshing large gear 484, and a pinion 486, Figs. 2 and 17 to 19, inclusive.

The pinion 486 is rigidly mounted upon a trip clutch 488 of the same construction and operation as the trip clutches hereinbefore described. The trip clutch 488 is loosely mounted upon the lower portion of the left-hand packer shaft 208 and is driven by a dog 490 fixed to the lower end of said packer shaft 208. During the period that the shock is being formed and the cap bundles are being supplied to the shock-forming arms 46, the trip clutch 488 and its pinion 486 remain idle, the clutch lever 492 and its roller 494 being held out of gear with the dog 490 by a detent 496 pivoted to a supporting member 498 secured to the underside of the associated gear case 127 and the adjacent portion of the shocker frame.

The detent 496 is held in the path of the clutch lever 492 by a coil spring 500 until the needle actuating mechanism hereinbefore described is thrown into play to bind the shock, whereupon the detent 496 is drawn out of the path of the clutch lever 492 through the intermediacy of a cable 502, a crank shaft 506 to which said cable 502 is attached, and a cable 510 attached to said crank shaft 506 and the segmental gear 428 of the needle actuating mechanism. The crank shaft 506 is mounted in the two left frame members 40 and 42 and is best shown by Figs. 12 and 29. After the detent 496 has been drawn out of the path of the trip clutch 488 as stated, the latter is then driven one revolution by the dog 490, during which time the detent 496 is permitted to be drawn by the spring 500 into the path of the clutch lever 492 to stop the trip clutch 488. As the trip clutch 488 makes the revolution above described, it carries the pinion 486 therewith, which, in turn rotates the large gear 484 a partial revolution, or until the forward end of a cam 512 on the underside of said large cog wheel 484 approaches the end 514 of the detent 496. The parts then remain stationary until the two cap bundles are bound together, whereupon the detent 496 is again drawn out of the path of the clutch lever 492. The trip clutch 488 is then driven by the dog 490 and drives the pinion 486 which in turn drives the large cog wheel 484.

As the large cog wheel 484 starts on the remainder of its revolution the cam 512 engages and holds the detent 496 out of the path of the trip clutch 492, after which it passes out of engagement with said detent 496 and permits it to be thrown into the path of the clutch lever 492 to stop the same by the spring 500. During the period that the large cog wheel 484 is completing its revolution as above stated it drives the small spur gear 482 a number of revolutions, and through the intermediacy of the train connecting it to the roller 456, accelerates the speed of the endless conveyer 450, as above described.

About the time that the cam 512 passes out of engagement with the detent 496, a cam 516 on the upper side of the large gear 484 contacts a disk 518 surmounting the small gear 482 and of larger diameter and thereby pushes said gear 482 out of mesh with the large cog wheel 484, so that the ratchet mechanism 466, 468 may resume its operation of driving the endless conveyer 450 step by step during the building of another shock. To allow for demeshing of the gear 482 from the gear 484, the shaft 480 is loosely mounted at its upper end in a bearing 493 and at its lower end in a slot 495 of the supporting element 498. The lower end of the shaft 480 is pressed toward the large gear 484 by a rod 497, operating in a guide 499, and a coil spring 501 interposed between the guide 499 and a nut 503 threaded upon one end of the rod 497, Fig. 19.

When the speed of the endless conveyer 450 is accelerated as above described, the platform 460 is lowered until the runners 461 travel upon the ground to facilitate the delivery of the shock and the two cap bundles. Lowering of the platform 460 is effected as follows: The large cog wheel 484 has a grooved cam 520 at its upper surface provided with a concentric portion 522 and an oppositely-disposed, irregular portion 524. A roller 528 is disposed within the cam 520 and mounted upon one end of a lever 530 fulcrumed at 532 on a stud depending from the underside of the left-hand gear case 127. Said lever 530 is connected to a toggle 534 and a link 536, Fig. 17. Two cables 538 are connected at their forward ends to said link 536 and at their rear ends to arms 540 secured to opposite sides of the platform 460 and reinforced by braces 542. In their passage from the link 536 to the arms 540 the cables 538 run over sheaves 543, 544, 546, and 548 at opposite sides of the shocker frame.

As the irregular portion 524 of the grooved cam 520 passes into engagement with the roller 528 it swings the lever 530 upon its fulcrum and towards the cable 538 so that the same may run over the guide sheaves above described and permit the platform 460 to move downward by its own weight and that of the shock thereon. The platform 460 remains in lowered position until the concentric portion 522 of the cam 520 passes the roller 528 and the portion 526 of the grooved cam 520 engages said roller and shifts the lever 530 in a direction to pull upon the cables 538 and raise the platform 460. By the time the cam 520 has reached the position disclosed by Fig. 17, the platform 460 is fully raised and the clutch 488 is thrown out of gear with the dog 490, allowing the large cog wheel 484 to come to rest. The cables 538 are assisted in raising the platform by cables 550 and springs 552 attached to the rear portion of the frame member 26 and the upper ends of the arms 540, Fig. 1.

When the platform 460 is lowered as above stated, the shock-forming arms 46 are opened to deliver the shock and the two cap bundles as follows: During the building of the shock the arms 46 are gradually expanded by the pressure of the bundles as they are forced into said arms. During such expansion of the arms 46 they partially rotate shafts 554 to which they are fixed through the intermediacy of collars 556. The shafts 554 are journaled in the frame members 36, 38, 40 and 42, and the respective gear cases 127.

Each gear case 127 contains a housing 558 fixed to the lower portion of the respective shafts 554 and into which a hub 560 projects from an underlying segmental gear 562 loosely mounted upon the associate shaft 554. The segmental gear 562 has an extension 564, which carries a pivotally-mounted dog 566, the free end of which is normally held in engagement with the periphery of the housing 558 by a spring 570 to engage in a notched portion 572 on the periphery of the housing 558, as the same is partially rotated by the associate shaft 554.

The entrance of the dog 566 into the notched portion 572 occurs at the time that the two cap bundles are forced into the shock-forming arms 46 and results in locking the latter until the toggle 534 is actuated to lower the platform 460. When this occurs the toggle 534 in its forward movement rocks two cranks 574, Figs. 8, 14, 15 and 17 which in turn actuate segmental gears 576, causing the same to rock the intermeshing segmental gears 562 in opposite directions until shoulders 578 on the dogs 566 pass the adjacent ends of dogs 580. The segmental gears 564 are then restored to initial position as the toggle 534 moves backward to raise the platform 460, and in carrying the dogs 566 backward the same are disengaged from the notched portions of the housings 558 by the shoulders 578 contacting the dogs 580. The shock-forming arms 46 are then quickly closed through the action of spiral springs 582 connected to the gear hubs 560 and the housings 558, and which were wound by the housings 558 during their movements from initial position disclosed by Fig. 14, until the shoulders 578 passed the dogs 580, as above stated.

While the foregoing description sets forth in detail the construction and operation of the shocker, it may be briefly stated in addition that as each bundle is discharged from the binder it falls into the bundle carrier 48, into which it is guided by the arms 66 and 68. The sprocket mechanism is then started through the intermediacy of the rock shaft 160, which through the intervening parts trips the detent 148, Fig. 23, out of engagement with the clutch lever 138, so that the sprocket wheels 114 will be driven through the intermediacy of the trip clutch 144 and the rotary dog 136. The dogs 168 then move the loaded bundle carrier 48 backward and upward during which movement the arms 66 are closed by the roller 98 and the curved guide 96, and held in closed position by the stop 100 and the latch 102 until the carrier 48 returns to initial position. By the time the dogs 168 move the carrier 48 backwardly and upwardly to the position disclosed by Fig. 8, the succeeding follower 170 contacts the lower end of the bundle and pushes it backward where it is engaged by the packers 184 and 185 and forced backwardly into the shock-forming arms 46, the pressure exerted on the bundle being sufficient to force the fingers 64 of the bundle carrier 48 to open position. As the fingers 64 are forced open they rock the shafts 58 and 60, which cause the arms 68 and 70 to engage the upper portion of the bundle and expel it from the bundle carrier 48. The lower packers 185 alternately force the bundles to opposite sides of the shock-forming arms 46 as disclosed by Fig. 13, and spread the butt ends of the bundles apart so that the completed shock will have a broad base upon which to stand. The packers are assisted in carrying the bundles backwardly into the shock-forming arms 46 by the endless conveyer 450, which also assists in spreading the butt ends of the bundles apart by carrying them backwardly faster than the upper ends of the bundles. Just as soon as the bundle carrier 48 is relieved of a bundle it is moved forward to receive another bundle through the force of gravity and the spiral spring 204 acting upon the spools 198 and the cords 196. As the bundle carrier 48 approaches its initial position the forward end of the latch 102 contacts the transverse bar 105 and is caused thereby to release the stop 100, whereupon the spring 92 rocks the shaft 62 and opens the arms 66 and 68, the fingers 64 having been previously closed by the segmental gears 72, 76, 74 and 78 and the crank arms 84, which latter are restored against the upper ends of the channel bars 44 by the respective springs 88 and 90.

As the bundles are forced backwardly by the packers upon the endless conveyor 450, the latter carries said bundles into the shock-forming arms 46 which are gradually expanded from the full line position disclosed by Fig. 10, to the intermediate dotted line position by the pressure of the bundles. After a certain number of bundles have been carried backwardly to the shock-forming arms 46 the tally mechanism brings the binding mechanism into action and the complete shock is securely bound, after which the two cap bundles are carried backwardly into the shock-forming arms 46. As the two cap bundles 46 move backwardly they are bound together and as they reach the shock the arms 46 are quickly opened to the extreme dotted position disclosed by Fig. 10, the conveyor 450 is speeded up and the platform 460 is lowered to the ground to insure the discharge of the shock and the cap bundles in upright position into the stubble. Preparatory to going to and from the field, the platform 460 is raised as indicated by the dotted arrow, Fig. 1, and tied or otherwise secured in such position.

While I have shown the preferred form of the invention, I reserve the right to make such changes in the construction, combination and arrangement of parts as properly fall within the spirit and scope of the appended claims.

Having thus described my invention, what I claim and desire to secure by Letters Patent, is:—

1. In a machine of the character described, the combination with a portable supporting frame, of cooperating shock forming arms mounted thereon, reciprocatory means for conducting bundles of grain to said shock forming arms and raising said bundles, a lower set of packers for alternately forcing the bundles into opposite sides of the shock forming arms, an upper set of packers cooperating with the lower set in forcing the bundles into the shock forming arms, and mechanism for opening the shock forming arms to discharge the completed shock therefrom.

2. In a machine of the character described, the combination with a portable supporting frame, of cooperating shock forming arms mounted thereon, reciprocatory means for conducting bundles of grain to said shock forming arms and raising said bundles, packers for alternately forcing the bundles into opposite sides of the shock forming arms, mechanism for opening the shock forming arms to discharge the completed shock therefrom, and a conveyer for depositing the shock upon the ground.

3. In a machine of the character described, the combination with a portable supporting frame, of cooperating shock forming arms mounted thereon, reciprocatory means for conducting bundles of grain to said shock forming arms and raising said bundles, packers for alternately forcing the bundles into opposite sides of the shock forming arms, mechanism for opening the shock forming arms to discharge the completed shocks therefrom, and resilient means for closing the shock forming arms after the shock has been discharged.

4. In a machine of the character described, the combination with a portable supporting frame, of cooperating shock forming means mounted thereon; reciprocatory means for conducting bundles of grain to said shock forming means and raising said bundles, packers for alternately forcing the bundles into opposite sides of the shock forming means, mechanism for opening the shock forming means to discharge the completed shock therefrom, an endless conveyer below the shock forming means, to support the bundles, mechanism for intermittently causing said conveyer to coact with the packers in forcing the bundles into the shock forming means, and gearing for moving the conveyer continuously until the completed shock is deposited upon the ground.

5. In a machine of the character described, the combination with a portable supporting frame, of cooperating shock forming means mounted thereon, reciprocatory arms for conducting bundles of grain to said shock forming arms, packers for forcing the bundles into the shock forming arms, mechanism for opening the shock forming arms to discharge the completed shock therefrom, an endless conveyer below the shock forming arms to support the bundles, pawl and ratchet mechanism for intermittently causing said conveyer to coact with the packers in forcing the bundles into the shock forming means, and gearing for moving the conveyer continuously until the completed shock is deposited upon the ground.

6. In a machine of the character described, the combination with a portable supporting frame of cooperating shock forming arms mounted thereon, a track supported by said frame and extending rearwardly adjacent to said shock forming arms, a second track extending upwardly from the first track, a carrier mounted on said tracks to conduct bundles of grain to the shock forming arms and raise said bundles, and mechanism for moving said carrier backward and upward with the bundles.

7. In a machine of the character described, the combination with a portable supporting frame of cooperating shock forming arms mounted thereon, tracks supported by said frame and extending rearwardly adjacent to said shock forming arms, a second track extending upwardly from the first track, a carrier mounted on said tracks to conduct bundles of grain to the shock forming arms and raise said bundles, mechanism for moving said carrier backward and upward with the bundles, and mechanism for restoring said carrier to initial position to receive another bundle.

8. In a machine of the character described, the combination with a wheeled frame, of shock forming means mounted thereon, tracks supported by said frame and extending rearwardly and upwardly adjacent to said shock forming means, a carrier mounted on said tracks to conduct bundles of grain to the shock forming means and raise said bundles, mechanism for moving said carrier backward and upward with the bundles, a spool mounted adjacent to the forward end of one of the tracks, a cable attached to said spool and the carrier, and means for rotating said spool to wind the cable and restore the carrier to initial position to receive another bundle.

9. In a machine of the character described, the combination with a wheeled frame, of shock forming means mounted thereon, tracks supported by said frame and extending rearwardly and upwardly adjacent to said shock forming means, a carrier mounted on said tracks to conduct bundles of grain to the shock forming means and raise said bundles, mechanism for moving said carrier backward and upward with the bundles, spools mounted adjacent to the forward end of the tracks, cables attached to said spools and carrier, and a spiral spring for rotating said spools to wind the cable and restore the carrier to initial position to receive another bundle.

10. In a machine of the character described, a reciprocatory bundle carrier, and cushioning means for checking the movements of said bundle carrier.

11. In a machine of the character described, a reciprocatory bundle carrier, cushioning means for checking the movement of said bundle carrier, and a resilient element adjacent one of said cushioning means to prevent the carrier from rebounding on returning to initial position.

12. In a machine of the character described, a bundle carrier consisting of end members, superimposed rock shafts journaled in said members and constituting one side of the bundle carrier, arms fixed to the upper rock shaft to open and close the top of the carrier, fingers on the lower rock shaft to open and close a portion of the bottom of the carrier, a rock shaft at the opposite side of the carrier, and fingers on the last-mentioned rock shaft to cooperate with the first-mentioned fingers in opening and closing the bottom of the carrier.

13. In a machine of the character described, a bundle carrier consisting of end members, superimposed rock shafts journaled in said members and constituting one side of the bundle carrier, arms fixed to the upper rock shaft to open and close the top of the carrier, fingers on the lower rock shaft to open and close a portion of the bottom of the carrier, a rock shaft at the opposite side of the carrier, fingers on the last-mentioned rock shaft to cooperate with the first-mentioned fingers in opening and closing the bottom of the carrier, cranks geared to the lowermost rock shafts, and resilient means connected to said cranks to cause the same to normally hold the lower rock shafts and their fingers in closed position.

14. In a machine of the character described, a bundle carrier consisting of end members, superimposed rock shafts journaled in said members and constituting one side of the bundle carrier, arms fixed to the upper rock shaft to open and close the top of the carrier, latch means to secure said upper rock shaft in position to hold the arms closed, spring means to rotate the upper rock shaft to open the arms when said latch means is disengaged, fingers on the lower rock shaft to open and close a portion of the bottom of the carrier, a rock shaft at the opposite side of the carrier, and fingers on the last-mentioned rock shaft to cooperate with the first-mentioned fingers in opening and closing the bottom of the carrier.

15. In a machine of the character described, the combination with a portable frame, of a curved guide associated with said frame, a reciprocatory bundle carrier for carrying bundles of grain to one end of said frame and consisting of end members, superimposed rock shafts journaled in said members and constituting one side of the bundle carrier, arms fixed to the upper rock shaft to form the top of the carrier, latch means to secure said upper rock shaft in position to hold the arms closed, spring means to rotate the upper rock shaft to open said arms when said latch means is disengaged, means on the upper rock shaft to coact with the curved guide in restoring said upper rock shaft in position to be latched, fingers on the lower rock shaft to form a portion of the bottom of the carrier, a rock shaft at the opposite side of the carrier, and fingers on the last-mentioned rock shaft to cooperate with the first-mentioned fingers in forming the bottom of the carrier.

16. In a machine of the character described, the combination with a wheeled frame, of shock forming means mounted thereon, a reciprocatory carrier for conducting grain to said shock forming means, endless mechanism for moving the loaded carrier to the shock forming means, a constantly driven shaft, gearing for transmitting motion from said shaft to the endless mechanism, and means actuated by the endless mechanism for throwing said gearing out of gear when the carrier reaches its delivery position.

17. In a machine of the character described, the combination with a portable frame, of shock forming means mounted at the rear portion of said frame, a carrier for conducting grain from the forward portion of the machine rearwardly to said shock forming means, endless mechanism for moving the loaded carrier to the shock forming means, a constantly driven shaft, a clutch for transmitting motion from said shaft to the endless mechanism, means controlled by the endless mechanism for throwing the clutch out of gear when the carrier reaches its delivery position, and mechanism for depositing the completed shock upon the ground.

18. In a machine of the character described, the combination with a portable frame, of shock forming means mounted thereon, a carrier for conducting grain to said shock forming means, sprocket mechanism for moving the loaded carrier to the shock forming means, a constantly driven shaft, a clutch for transmitting motion from said shaft to the endless mechanism, an element for engaging and holding the clutch out of gear to stop the sprocket mechanism, a trip lever for holding said element out of engagement with the clutch so that the same may drive the sprocket mechanism, means on the sprocket mechanism for throwing said trip lever out of engagement with the element when the carrier reaches delivery position, and means actuated each time the carrier is supplied with a bundle for restoring the trip lever to active position to allow the clutch to resume its operation of driving the sprocket mechanism.

19. In a machine of the character described, the combination with a portable frame, of shock forming means mounted thereon, a carrier for conducting grain to said shock forming means, sprocket mechanism for moving the loaded carrier to the shock forming means, a constantly driven shaft, a clutch for transmitting motion from said shaft to the endless mechanism, an element for engaging and holding the clutch out of gear to stop the sprocket mechanism, a trip lever for holding said element out of engagement with the clutch so that the same may drive the sprocket mechanism, means on the sprocket mechanism for throwing said trip lever out of engagement with the element when the carrier reaches delivery position, and a flexible crank shaft actuated each time the carrier receives a bundle and connected to said trip lever to restore it to active position.

20. In a machine of the character described, a portable frame, oppositely disposed shock forming arms mounted thereon, a reciprocatory carrier for conducting bundles to said arms, means for actuating said carrier, cushioning means for checking the movements of said carrier, resilient means for closing said arms and which permit the same to expand as bundles are delivered thereto, and cam actuated mechanism for opening said arms when the shock is completed.

21. In a machine of the character described, a portable frame, oppositely disposed shock forming arms mounted thereon, a reciprocatory carrier for conducting bundles to said arms, means for actuating said carrier, means for preventing said carrier from rebounding on returning to initial position, resilient means for closing said arms and which permit the same to expand as bundles are delivered thereto, mechanism embodying latch means for opening and securing the arms in open position for delivery of the shock, and trip means for disengaging said latch means to allow the resilient means to close the arms after delivery of the shock.

22. In a machine of the character described, a portable frame, oppositely disposed shock forming arms mounted thereon, a carrier for conducting bundles to said arms, resilient means for closing said arms and which permit the same to expand as the bundles are delivered thereto, latch means for opening and securing the arms in open position for delivery of the shock, gears for actuating said latch means, a rotary cam, mechanism controlled by said cam for actuating the gears, and trip means for disengaging the latch means to allow the resilient means to close the arms after delivery of the shock.

23. In a machine of the character described, a portable frame, oppositely disposed shock forming arms mounted thereon, a carrier for conducting bundles to said arms, resilient means for closing said arms and which permit the same to expand as bundles are delivered thereto, rock shafts upon which the arms are fixedly-mounted, members fixed to said shafts, dogs engaged by said members when the shock is completed, gears for actuating said dogs to effect opening of the arms to deliver the shock, mechanism for actuating said gears, and trip means for disengaging the dogs from the associate members to allow the resilient means to close the arms after delivery of the shock.

24. In a machine of the character described, a portable frame, oppositely disposed shock forming arms mounted thereon, a carrier for conducting bundles to said arms, resilient means for closing said arms and which permit the same to expand as bundles are delivered thereto, rock shafts upon which the arms are fixedly-mounted, members fixed to said shafts, dogs engaged by said members when the shock is completed, gears for actuating said dogs to effect opening of the arms to deliver the shock, toggle means for actuating said gears, a lever for actuating said toggle means, rotary means for actuating said lever, and trip means for disengaging the dogs from the associate members to allow the resilient means to close the arms after delivery of the shock.

25. In a machine of the character described, a portable frame, oppositely disposed shock forming arms mounted thereon, a reciprocatory carrier for conducting bundles to said arms, means for actuating said carrier, a curved track traversed by said carrier, means for closing said arms and which permit the same to expand as the bundles are delivered thereto, mechanism for opening the arms for delivery of the completed shock, clutch means for actuating said mechanism, means for holding said clutch means out of gear during formation of the shock, and mechanism for throwing the clutch means in gear during opening of the arms and delivery of the shock.

26. In a machine of the character described, a portable frame, oppositely disposed shock forming arms mounted thereon, a carrier for conducting bundles to said arms, means for closing said arms and which permit the same to expand as the bundles are delivered thereto, mechanism for opening the arms for delivery of the completed shock, clutch means for actuating said mechanism, a detent for holding said clutch means out of gear during formation of the shock, and mechanism for disengaging said detent from the clutch means during opening of the arms and delivery of the shock.

27. In a machine of the character described, a portable frame, oppositely disposed shock forming arms mounted thereon, a carrier for conducting bundles to said arms, means for closing said arms and which permit the same to expand as the bundles are delivered thereto, mechanism for opening the arms for delivery of the completed shock, clutch means for actuating said mechanism, a detent for holding said clutch means out of gear during formation of the shock, means for disengaging said detent from the clutch means, and a cam for holding the detent out of engagement with the clutch means during the opening of the arms and delivery of the shock.

28. In a machine of the character described, a portable frame, oppositely disposed shock forming arms mounted thereon, a carrier for conducting bundles to said arms, means for closing said arms and which permit the same to expand as the bundles are delivered thereto, mechanism for opening the arms for delivery of the completed shock, clutch means for actuating said mechanism, a detent for holding said clutch means disengaged during formation of the shock, mechanism for binding the completed shock, and trip means actuated by said binding mechanism for throwing the detent out of engagement with the clutch means as the shock is bound.

29. In a machine of the character described, shock forming means, an endless conveyer extending beneath said shock forming means, mechanism for intermittently actuating said conveyer so that the same will aid in forming the shock, and mechanism for driving the conveyer continuously in effecting delivery of the completed shock upon the ground.

30. In a machine of the character described, shock forming means, an endless conveyer extending beneath said shock forming means, pawl and ratchet mechanism for intermittently actuating said conveyer so that the same will aid in forming the shock, and mechanism for driving the conveyer continuously in effecting delivery of the completed shock upon the ground.

31. In a machine of the character described, shock forming means, an endless conveyer extending beneath said shock forming means, pawl and ratchet mechanism for intermittently actuating said conveyer so that the same will aid in forming the shock, a rotary shaft, means actuated by said rotary shaft for driving the pawl and ratchet mechanism, and mechanism for driving the conveyer continuously in effecting delivery of the completed shock upon the ground.

32. In a machine of the character described, shock forming means, an endless conveyer extending beneath said shock forming means, mechanism for intermittently actuating said conveyer so that the same will aid in forming the shock, mechanism for driving the conveyer continuously in effecting delivery of the completed shock upon the ground, and means for throwing the last-mentioned mechanism out of gear after the shock has been discharged upon the ground.

33. In a machine of the character described, shock forming means, an endless conveyer extending beneath said shock forming means, mechanism for intermittently actuating said conveyer so that the same will aid in forming the shock, mechanism for driving the conveyer continuously in effecting delivery of the completed shock upon the ground, and a cam for throwing the last-mentioned mechanism out of gear after the shock has been discharged upon the ground.

34. In a machine of the character described, shock forming means, an endless conveyer extending beneath said shock forming means, mechanism for intermittently actuating said conveyer so that the same will aid in forming the shock, binding mechanism for binding the shock, and gearing actuated by said binding mechanism for accelerating the speed of the conveyer in effecting delivery of the completed shock upon the ground.

35. In a machine of the character described, shock forming means, an endless conveyer extending beneath said shock forming means, mechanism for actuating said conveyer step by step, a dump platform associated with said conveyer to coact therewith in delivering the completed shock upon the ground, and means for lowering said platform to facilitate delivery of the shock.

36. In a machine of the character described, shock forming means, an endless conveyer extending beneath said shock forming means, a dump platform associated with said conveyer to coact therewith in delivering the completed shock upon the ground, mechanism for actuating the conveyer and lowering said platform to deliver the completed shock upon the ground, and mechanism for accelerating the speed of the conveyer to effect delivery of the shock upon the ground.

37. In a machine of the character described, shock forming means, an endless conveyer extending beneath said shock forming means, mechanism for actuating said conveyer, a dump platform associated with said conveyer to coact therewith in delivering the completed shock upon the ground, cables for raising and lowering said platform, and mechanism including toggle means for actuating said cables.

38. In a machine of the character described, shock forming means, an endless conveyer extending beneath said shock forming means, mechanism for actuating said conveyer intermittently during formation of the shock, mechanism for moving said conveyer continuously to deliver the completed shock upon the ground, a dump platform associated with said conveyer to coact therewith in delivering the completed shock upon the ground, cables for raising and lowering said platform, mechanism for actuating said cables, and counterbalance means to assist the cables in restoring the platform to raised position.

39. In a machine of the character described, shock forming means, an endless conveyer extending beneath said shock forming means, mechanism for actuating said conveyer, a dump platform associated with said conveyer to coact therewith in delivering the completed shock upon the ground, cables for raising and lowering said platform, a toggle for actuating said cables, a lever for actuating said toggle, a cam for actuating said lever, and a driven gear wheel for driving said cam.

40. In a machine of the character described, shock forming means, an endless conveyer extending beneath said shock forming means, a dump platform associated with said conveyer to coact therewith in delivering the completed shock upon the ground, cables for raising and lowering said platform, a toggle for actuating said cables, a lever for actuating said toggle, a cam for actuating said lever, a driven gear wheel for driving said cam, and mechanism driven by said gear wheel for actuating the conveyer.

41. In a machine of the character described, shock forming means, sets of packers for forcing bundles into said shock forming means, gearing for driving each set of packers, and mechanism for alternately throwing said gearing out of gear so that one set of packers will be at rest while the other set is in operation.

42. In a machine of the character described, shock forming means, sets of packers for forcing bundles into said shock forming means, gearing for driving each set of packers, detents for throwing said gearing out of gear, and alternately actuated trip levers for actuating said detents to effect alternate operation of the sets of packers.

43. In a machine of the character described, shock forming means, sets of packers for forcing bundles into said shock forming means, gearing for driving each set of packers, detents for throwing said gearing out of gear, trip levers for actuating said detents, an intermediately driven rotary member, and diametrically opposed elements on said rotary member for actuating the trip levers to effect alternate operation of the sets of packers.

44. In a shocker adapted to be coupled to a grain binder, shock forming means, a carrier for receiving bundles from the grain binder and conducting them to said shock forming means, oppositely disposed packers for forcing the bundles into said shock forming means, gearing for driving said oppositely disposed packers, and mechanism controlled by the delivery mechanism of the grain binder for alternately throwing said gearing out of gear to effect alternate operation of the sets of packers.

45. In a machine of the character described, means for forming shocks from bundles, mechanism for binding the completed shocks, tally mechanism to effect the operation of the binding mechanism after each shock has been supplied with a certain number of bundles, and rollers which follow the bundles to the shock forming means for controlling said tally mechanism.

46. In a machine of the character described, means for forming shocks from bundles, mechanism for binding the completed shocks, tally mechanism to effect the operation of the binding mechanism after each shock has been supplied with a certain number of bundles, and mechanism including endless sprocket chains and rollers for conducting the bundles to the shock forming means and actuating said tally mechanism.

47. In a machine of the character described, shock and cap forming means, mechanism for conducting bundles to said shock and cap forming means, a rotary member which is advanced a step as each bundle is conducted to the shock and cap forming means, and shock binding mechanism which is actuated to bind a shock and then bind a cap as the rotary member completes a certain number of steps.

48. In a machine of the character described, shock forming means, mechanism for conducting bundles to said shock forming means, a rotary member having a relatively large group of teeth to determine the number of bundles to enter into each shock and a relatively small group of teeth to determine the number of bundles to enter into a cap for each shock, mechanism for advancing said rotary member a tooth as each bundle is conducted to the shock forming means, intermittent means for driving the rotary member through the intervals separating the groups of teeth, and shock binding mechanism which is actuated as the rotary member completes its travel through each group of teeth.

49. In a machine of the character described, shock forming means, a reciprocatory carrier for conducting bundles to said shock forming means, endless mechanism for actuating said carrier, gearing for driving said endless mechanism, and means on said endless mechanism for forcing the bundles from the carrier into the shock forming means.

50. In a machine of the character described, shock forming means, a reciprocatory carrier for conducting bundles to said shock forming means, endless mechanism for actuating said carrier, gearing for driving said endless mechanism, means on said endless mechanism for forcing the bundles from the carrier into the shock forming means, and alternately actuated mechanism for forcing the bundles into opposite sides of the shock forming means.

51. In a machine of the character described, shock forming means, a reciprocatory carrier for conducting bundles to said shock forming means, endless mechanism for actuating said carrier, gearing for driving said endless mechanism, means on said endless mechanism for forcing the bundles from the carrier into the shock forming means, alternately actuated mechanism for forcing the bundles into opposite sides of the shock forming means, and a conveyer for carrying the bundles into the rear portion of the shock forming means.

52. In a machine of the character described, shock forming means, a reciprocatory carrier for conducting bundles to said shock forming means, endless mechanism for actuating said carrier, gearing for driving said endless mechanism, means on said endless mechanism for forcing the bundles from the carrier into the shock forming means, alternately actuated mechanism for forcing the bundles into opposite sides of the shock forming means, a conveyer for carrying the bundles into the rear portion of the shock forming means, mechanism for opening the shock forming means on completion of the shock, and mechanism for accelerating the speed of the conveyer to effect delivery of the shock upon the ground.

53. In a machine of the character described, shock forming means, a reciprocatory carrier for conducting bundles to said shock forming means, endless mechanism for actuating said carrier, gearing for driving said endless mechanism, means on said endless mechanism for forcing the bundles from the carrier into the shock forming means, alternately actuated mechanism for forcing the bundles into opposite sides of the shock forming means, a conveyer for carrying the bundles into the rear portion of the shock forming means, mechanism for opening the shock forming means on completion of the shock, mechanism for accelerating the speed of the conveyer to effect delivery of the shock upon the ground, a dump platform associated with the conveyer, and means for lowering said platform to facilitate the delivery of the shock.

54. In a machine of the character described, shock forming means, a reciprocatory carrier for conducting bundles to said shock forming means, endless mechanism for actuating said carrier, gearing for driving said endless mechanism, means on said endless mechanism for forcing the bundles from the carrier into the shock forming means, alternately actuated mechanism for forcing the bundles into opposite sides of the shock forming means, a conveyer for carrying the bundles into the rear portion of the shock forming means, mechanism for binding the shock, mechanism for opening the shock forming means after binding the shock, and mechanism for accelerating the speed of the conveyer to effect delivery of the shock upon the ground.

55. In a shocker adapted to be coupled to a grain binder, shock forming means mounted on said shocker, a reciprocatory carrier on the shocker to receive grain from the binder and conduct it to said shock forming means, endless mechanism for moving the loaded carrier to the shock forming mechanism, a constantly driven shaft, a trip clutch for transmitting motion from said shaft to the endless mechanism, throw-out mechanism actuated by the endless mechanism for throwing said trip clutch out of gear to stop the endless mechanism when the carrier reaches the shock forming means, and means controlled by the grain binder for disengaging said throw-out mechanism from the trip clutch when the carrier receives another charge of grain from the binder.

56. In a shocker adapted to be coupled to a grain binder, shock forming means mounted on said shocker, a reciprocatory carrier on the shocker to receive grain from the binder and conduct it to said shock forming means, endless mechanism for moving the loaded carrier to the shock forming mechanism, a constantly driven shaft, a trip clutch for transmitting motion from said shaft to the endless mechanism, a detent for throwing the trip clutch out of gear to stop the endless mechanism when the carrier reaches the shock forming means, and mechanism controlled by the grain binder for disengaging said detent from the trip clutch when the carrier receives another charge of grain from the grain binder.

57. In a machine of the character described, a needle having a longitudinal passageway for binding twine, tensioning means on said needle for holding the twine taut, and rack teeth on said needle, for the purpose described.

In testimony whereof I affix my signature, in the presence of two witnesses.

RAY B. GAUNT.

Witnesses:
F. G. FISCHER,
L. J. FISCHER.